(12) United States Patent
Suzuki et al.

(10) Patent No.: US 6,475,113 B2
(45) Date of Patent: Nov. 5, 2002

(54) HYDRAULIC CONTROL SYSTEM OF AUTOMATIC TRANSMISSION

(75) Inventors: Akitomo Suzuki, Anjo (JP); Kazumasa Tsukamoto, Anjo (JP); Masaaki Nishida, Anjo (JP); Takayuki Hisano, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/940,802

(22) Filed: Aug. 29, 2001

(65) Prior Publication Data

US 2002/0025884 A1 Feb. 28, 2002

Related U.S. Application Data

(63) Continuation of application No. 09/466,871, filed on Dec. 20, 1999, now Pat. No. 6,302,822.

(30) Foreign Application Priority Data

Feb. 24, 1999 (JP) ............................................. 11-047264

(51) Int. Cl.$^7$ ............................................... F16H 61/26
(52) U.S. Cl. ....................... 477/127; 477/131; 477/138; 477/155; 477/164; 475/120; 475/123
(58) Field of Search ................................ 477/127, 143, 477/98, 156, 174, 158, 159, 148, 131, 138, 155, 164; 475/119, 120, 122, 123

(56) References Cited

U.S. PATENT DOCUMENTS

| | | | |
|---|---|---|---|
| 4,903,551 A | 2/1990 | Hiramatsu et al. | ............. 74/869 |
| 4,934,215 A * | 6/1990 | Miura et al. | ................ 475/283 |
| 5,010,786 A * | 4/1991 | Hiramatsu et al. | ............. 74/867 |
| 5,086,668 A | 2/1992 | Fujiwara et al. | ............... 74/866 |
| 5,383,379 A | 1/1995 | Niiyama | .................... 74/733.1 |
| 5,441,459 A | 8/1995 | Inukai et al. | ................ 475/127 |
| 5,454,763 A | 10/1995 | Ikebuchi et al. | ............. 475/128 |
| 5,503,605 A * | 4/1996 | Beim | ......................... 475/283 |
| 5,611,752 A | 3/1997 | Kamada et al. | ................ 477/98 |
| 5,741,200 A * | 4/1998 | Taniguchi et al. | ............. 477/93 |
| 5,785,628 A | 7/1998 | Kamada et al. | ............. 477/130 |
| 6,102,825 A | 8/2000 | Hisano et al. | ............... 475/118 |

FOREIGN PATENT DOCUMENTS

| | | | |
|---|---|---|---|
| DE | 197 46 681 A1 | 4/1998 | |
| EP | 0 668 455 A1 | 8/1995 | |
| JP | 2000170900 | * 6/2000 | ........... F16H/61/12 |
| JP | 2000186751 | * 7/2000 | ............. F16H/3/62 |

* cited by examiner

Primary Examiner—Richard M. Lorence
Assistant Examiner—Tisha D. Lewis
(74) Attorney, Agent, or Firm—Oliff & Berridge, PLC

(57) ABSTRACT

A hydraulic control system includes switching mechanisms for receiving as a signal pressure a hydraulic pressure which is output from each shifting mechanism when all units of the shifting mechanisms are caused to output a hydraulic pressure, and being responsive to the reception of the signal pressure to be switched to a predetermined state for blocking a hydraulic-pressure supply path to specific hydraulic servos, thereby achieving a specific speed out of a plurality of speeds; and supply switching mechanisms provided in a hydraulic-pressure supply path to a hydraulic servo which is not included in the specific hydraulic servos, for switching between supply and cut-off of the hydraulic pressure to the hydraulic servo so as to assure two speeds in the event of the signal failure in a hydraulic control system for individually controlling engaging elements in an automatic transmission by using electric signals.

16 Claims, 12 Drawing Sheets

FIG. 2

| POSITION | | CLUTCH/BRAKE ||||| SOLENOID VALVE ||||||
|---|---|---|---|---|---|---|---|---|---|---|---|---|
| | | UD CLUTCH | OD CLUTCH | 2ND BRAKE | LR BRAKE | REV CLUTCH | SLUD N-O | SLOD N-O | SL2ND N-O | SLLR N-O | SL1 N-C |
| P | | | | | | | ○ | ○ | ○ | × | × |
| R | | | | | ○ | ○ | ○ | ○ | ○ | × | × |
| N | | | | | ○ | | × | ○ | ○ | × | × |
| D | 1ST | ○ | | | ○ | | × | × | ○ | × | × |
| | 2ND | ○ | | ○ | | | × | × | × | ○ | ○ |
| | 3RD | ○ | ○ | | | | ○ | × | × | ○ | ○ |
| | 4TH | | ○ | ○ | | | × | × | × | × | × |
| UPON ELECTRICAL FAILURE | 1ST | ○ | | | | | | | | | |
| | 2ND | | | ○ | | | | | | | |
| | 3RD | | ○ | | | | | | | | |
| | 4TH | | ○ | ○ | | | | | | | |
| NOTE | | ○: ENGAGED ||||| ○: ENERGIZED ||||| |
| | | ×: — ||||| ×: DE-ENERGIZED ||||| |

N-O: NORMALLY-OPEN (OUTPUT A HYDRAULIC PRESSURE IN DE-ENERGIZED STATE)
N-C: NORMALLY-CLOSED (OUTPUT NO HYDRAULIC PRESSURE IN DE-ENERGIZED STATE)

FIG. 7

|  | CLUTCH/BRAKE | | | |
|---|---|---|---|---|
|  | UD CLUTCH | OD CLUTCH | 2ND BRAKE | LR BRAKE |
| CUT OFF VALVE A (60) | - |  | ○ | ● |
|  | - | ○ |  | ● |
|  | - | ○ | ○ | ● |
| CUT OFF VALVE B (61) | ● | ○ | ○ | - |
|  | ○ | ○ |  | - |
|  | ○ |  | ○ | - |
| NOTE | ○: SUPPLIED | | | |
|  | ●: SUPPLIED AND DRAINED | | | |

FIG. 9

| POSITION | | CLUTCH/BRAKE | | | | | | SOLENOID VALVE | | | | |
|---|---|---|---|---|---|---|---|---|---|---|---|---|
| | | C-1 | C-2 | C-3 | B-1 | B-2 | F-1 | SLC1 N-O | SLC2 N-O | SLC3 N-O | SLB1 N-O | SL1 N-C |
| P | | | | | | | | ○ | ○ | ○ | ○ | × |
| R | | | | ○ | | ○ | | ○ | ○ | × | ○ | × |
| N | | | | | | | | ○ | ○ | ○ | ○ | × |
| D | 1ST | ○ | | | | | ○ | × | ○ | ○ | ○ | △ |
| | 2ND | ○ | | | ○ | | | × | ○ | ○ | × | × |
| | 3RD | ○ | | ○ | | | | × | ○ | × | ○ | × |
| | 4TH | ○ | ○ | | | | | × | × | ○ | ○ | ○ |
| | 5TH | | ○ | ○ | | | | ○ | × | ○ | × | ○ |
| | 6TH | | ○ | | ○ | | | ○ | × | × | ○ | ○ |
| UPON ELECTRICAL FAILURE | 1ST | | | | | | | | | | | |
| | 2ND | ○ | | | | | | × | ○ | ○ | × | × |
| | 3RD | | | | | | | | | | | |
| | 4TH | | | | | | | | | | | |
| | 5TH | | ○ | ○ | | | | × | × | ○ | × | × |
| | 6TH | | | | | | | | | | | |
| NOTE | | ○ ENGAGED | | | | × - | △ ENGAGED UPON E/B | ○ ENERGIZED | | × DE-ENERGIZED | | △ ENERGIZED UPON E/B |

N-O: NORMALLY-OPEN (OUTPUT A HYDRAULIC PRESSURE IN DE-ENERGIZED STATE)
N-C: NORMALLY-CLOSED (OUTPUT NO HYDRAULIC PRESSURE IN DE-ENERGIZED STATE)
▨ : RELATIONSHIP BETWEEN SOLENOID VALVE AND CLUTCH/BRAKE IS INVERTED

FIG. 13

| | CLUTCH/BRAKE | | | | |
|---|---|---|---|---|---|
| | C-1 | C-2 | C-3 | B-1 | B-2 |
| C-1 CUT OFF VALVE NO.1 (77) | ● | ○ | ○ | — | — |
| | ○ | ○ | | — | — |
| | ○ | | ○ | — | — |
| C-1 CUT OFF VALVE NO.2 (78) | ● | ○ | — | ○ | — |
| | ○ | ○ | — | | — |
| | ○ | | — | ○ | — |
| B-2 CUT OFF VALVE (81) | — | ○ | | | ■ |
| | — | | ○ | | ■ |
| | — | | | ○ | ■ |
| | — | ○ | ○ | ○ | ■ |
| B1-C3 RELEASE VALVE (79) — C-2 ENGAGED | — | — | ■ | ○ | — |
| B1-C3 RELEASE VALVE (79) — C-2 DISENGAGED | — | — | ○ | ■ | — |
| NOTE | ○:SUPPLIED  ●:SUPPLIED AND DRAINED  ■:DRAINED IRRESPECTIVE OF SUPPLY STATE | | | | |

HYDRAULIC CONTROL SYSTEM OF AUTOMATIC TRANSMISSION

This is a Continuation of application Ser. No. 09/466,871 filed Dec. 20, 1999, now U.S. Pat. No. 6,302,822. The entire disclosure of the prior application is hereby incorporated by reference herein in its entirety.

BACKGROUND OF THE INVENTION

1. Field of Invention

The invention relates to an automatic transmission provided in vehicles, and more particularly, to a hydraulic control system for controlling engaging elements in the transmission mechanism.

2. Description of Related Art

In the systems in which electrically controlled solenoid valves supply a hydraulic pressure to respective hydraulic servos of a plurality of engaging elements, the hydraulic pressure may be simultaneously supplied from a plurality of solenoid valves in the event of the electrical failure or sticking of the valves (hereinafter, collectively referred to as "failure"). In such a case, three or more of the engaging elements may be simultaneously engaged, whereby the transmission may be interlocked. In order to prevent such a problem, a valve for supplying the hydraulic pressure only to two hydraulic servos is provided in the system. Such conventional art is disclosed, for example, in U.S. Pat. No. 4,903,551 or U.S. Pat. No. 5,010,786.

The conventional art is structured to ensure that, in the case of the failure, the hydraulic pressure is supplied to the hydraulic servos such that two engaging elements attaining the third speed are engaged. The third speed is assured because, at the third speed, a certain driving force required for limphome control in the forward four-speed gear train of the conventional art can be obtained, while preventing an abrupt engine brake resulting from shifting to the lower gear even upon failure at the highest, fourth speed.

In the case where the higher speed (e.g., the third speed in the above example) is ensured in the event of the failure, the vehicle may possibly fail to climb a steep hill during the limphome control, and/or may fail to run over a slight difference in level of the road during running at the low speed. However, if a lower speed is assured upon failure, an abrupt engine brake may occur. In view of the above, it is desirable that the running state be changed before and after the recognition of the failure by the driver, and that the speed to be attained is varied according to the driving force required to change the running state. In spite of such requirements, it is practically difficult to shift the gear during the failure.

SUMMARY OF THE INVENTION

The invention is made in view of the foregoing, and it is an object of the invention to provide a hydraulic control system of an automatic transmission, which is capable of attaining the higher speed during running at a high speed, while also attaining another speed to assure the driving force, in the event of the failure. Preferably, the automatic transmission has brakes, clutches and/or one-way-clutches as engaging elements.

In order to achieve the above-mentioned object, a hydraulic control system of an automatic transmission includes a plurality of engaging elements, a plurality of hydraulic servos each receiving a hydraulic pressure so as to control the respective engaging elements, and a plurality of shifting means for outputting the hydraulic pressure supplied to the respective hydraulic servos to achieve a plurality of forward speeds by engaging and disengaging the corresponding engaging elements. The hydraulic control system includes switching means for switching to a predetermined state where a specific speed among the plural speeds is achieved by cutting off a hydraulic pressure supply path to a specific hydraulic servo upon receipt of the output hydraulic pressure from all of said shifting means ready for outputting hydraulic pressure; and supply switching means, disposed in a hydraulic pressure supply path to a first hydraulic servo that is not included in the specific servo, for switching between supply and cut-off states of the hydraulic pressure to the first hydraulic servo.

More specifically, it is advantageous that the switching means receives as a signal pressure at least the hydraulic pressure supplied to the first hydraulic servo and is switched to the predetermined state only when the signal pressure is applied so as to achieve the specific speed by cutting off the supply of the hydraulic pressure to the specific hydraulic servo, and when the signal pressure is not applied so as to achieve another speed by continuing supply of the hydraulic pressure to a second hydraulic servo included in the specific hydraulic servo, the supply switching means allows the signal pressure to be supplied in a supply state and does not allow the signal to be supplied in the cut-off state.

Furthermore, it is advantageous that the hydraulic control system of an automatic transmission further includes a solenoid valve that applies a signal pressure for switching the supply switching means, and the solenoid valve switches the supply switching means to the supply side by applying the signal pressure to the supply switching means when achieving a speed with which the first hydraulic servo is engaged.

Moreover, it is advantageous that the solenoid valve applies the signal pressure to the supply switching means so as to be brought into a cut-off state in a de-energized state, and the supply switching means receives hydraulic pressure of the first hydraulic servo and is kept at the supply side by the hydraulic pressure supplied to the first hydraulic servo.

Moreover, in order to apply the invention to a multi-speed transmission, it is advantageous that the specific hydraulic servo includes a third hydraulic servo; the hydraulic servo which is not included in the specific hydraulic servo includes a fourth hydraulic servo; and the shifting means for supplying the respective hydraulic pressures to the third and fourth hydraulic servos is located downstream of the switching means, and a shifting valve for selectively shifting between the third and fourth hydraulic servos is disposed.

In order to avoid complication of the circuit structure, it is advantageous that the shifting valve receives the hydraulic pressure of the first hydraulic servo, and is switched in accordance with a state of the hydraulic pressure supplied to the first hydraulic servo.

Moreover, in the case where the invention is applied to a four-speed transmission, it is advantageous that a plurality of hydraulic servos include a hydraulic servo of a first clutch engaged upon attaining forward first to third speeds; a hydraulic servo of a second clutch engaged upon attaining the third and fourth speeds; a hydraulic servo of a first brake engaged upon attaining the second and fourth speeds; and a hydraulic servo of a second brake engaged upon attaining the first speed. In the case where the hydraulic pressure is output from the respective shifting means to all of the four hydraulic servos, the switching means includes a first switching valve that cuts off supply of hydraulic pressure to the hydraulic servo of the second brake by the hydraulic pressure supplied to the hydraulic servo of the first brake when the hydraulic servo of the second brake is in a state where the hydraulic pressure can be supplied, and further cuts off supply of the hydraulic pressure to the hydraulic servo of the second brake by the hydraulic pressure when the hydraulic servo of the second clutch is in the state where the hydraulic pressure can be supplied, and a second switching valve that cuts off supply of the hydraulic pressure to the first clutch by supplying the hydraulic pressure to the hydraulic servo of the first brake.

Moreover, in the case where the invention is applied to a six-speed transmission, it is preferred that a plurality of hydraulic servos include a hydraulic servo of a first clutch engaged upon attaining forward first to fourth speeds; a hydraulic servo of a second clutch engaged upon attaining the fourth to sixth speeds; a hydraulic servo of a third clutch engaged upon attaining the third and fifth speeds; a hydraulic servo of a first brake engaged upon attaining the second and sixth speeds; and a hydraulic servo of a second brake engaged upon attaining the first speed. In the case where the hydraulic pressure is output from the respective shifting means to all of the five hydraulic servos, the switching means includes first and second switching valves each cutting off supply of hydraulic pressure to the hydraulic servo of the first clutch from the corresponding shifting means by hydraulic pressure supplied to the hydraulic servo of the second clutch, a third switching valve selectively communicating the shifting means of the hydraulic servo of the third clutch and the shifting means of the hydraulic servo of the first brake with the hydraulic servo of the third clutch, and a fourth switching valve for cutting off supply of the hydraulic pressure to the hydraulic servo of the second brake by the hydraulic pressure which is selectively supplied to the respective hydraulic servos of the third clutch and the first brake.

According to one aspect of the invention, if the supply switching means is supplying the hydraulic pressure to the first hydraulic servo in the event of the failure which causes all the shifting means to output a hydraulic pressure, the specific speed is attained by the switching means. On the other hand, if the supply switching means is not supplying the hydraulic pressure to the first hydraulic servo in the event of the failure, the switching means is not switched to the prescribed state, and therefore, does not cut off the hydraulic pressure to the specific hydraulic servo. As a result, a speed other than the specific speed is attained. Accordingly, in the event of the failure, at least two speeds can be achieved depending upon the state of the supply switching means.

According to another aspect of the invention, due to the cooperative motion of the switching means and the supply switching means, at least two speeds can be achieved in the event of the failure, depending upon the state of the supply switching means.

According to another aspect of the invention, in the event of the failure, the supply switching means is switched to the supply side by the solenoid valve. Accordingly, the speed can be successfully achieved in the normal condition.

According to another aspect of the invention, the solenoid valve and the shifting means according to the invention are de-energized as a result of the failure. In the case where the hydraulic pressure is being supplied to the first hydraulic servo at the time of the failure, the supply switching means has been switched to the supply side by the hydraulic pressure of the first hydraulic servo. Accordingly, a specific speed is achieved by the switching means even if the solenoid valve is de-energized. On the other hand, in the case where the hydraulic pressure is not being supplied to the first hydraulic servo at the time of the failure, the supply switching means is switched to the cut-off side since the solenoid valve is de-energized. Accordingly, another speed is achieved by the switching means. Thus, two speeds can be achieved even if the solenoid valve also fails electrically. Moreover, due to the engine stop or the setting of the neutral range, the supply of the hydraulic pressure to the first hydraulic servo can be cut off at the time of the failure. In this case, the supply switching means is switched to the cut-off side, whereby another speed is achieved. Accordingly, setting the specific speed as a high speed and another speed as a low speed may prevent an abrupt engine braking during running as well as assure the driving force.

According to another aspect of the invention, instead of cutting off supply of the hydraulic pressure to the second hydraulic servo of the specific hydraulic servos to be cut off, the supply of the hydraulic pressure to the first hydraulic servo is cut off by the supply switching means, whereby another speed can be attained. In this case, however, the another speed is limited to the speed achieved by cutting off the supply of the hydraulic pressure to the third hydraulic servo. Therefore, by cutting off the fourth hydraulic servo that is not included in the specific servos and is different from the first hydraulic servo, instead of cutting off the third hydraulic servo, a choice of attainable speeds is increased. Accordingly, by shifting the connection between the shifting means and the hydraulic servos in the downstream of the switching means, supply of the hydraulic pressure to the fourth hydraulic servo is cut off instead of the third hydraulic servo. Therefore, the number of attainable speeds is increased.

According to another aspect of the invention, the shifting valve is switched based upon a state of the hydraulic-pressure supply to the first hydraulic servo. Therefore, the shifting valve can be switched in synchronization with the switching of the supply switching means. Accordingly, a special solenoid valve for the synchronized operation or the like is not required.

According to another aspect of the invention, the second speed is attained in the event of the failure at the first and second speeds, and the fourth speed is attained in the event of the failure at the third and fourth speeds. Therefore, even if the failure occurs during running of the vehicle, the gear is not shifted to the speed less than that attained during running. As a result, an abrupt engine brake can be prevented. Moreover, the second brake can be attained which provides driving force large enough to start the vehicle. Therefore, the minimum driving force required for running can be assured.

According to another aspect of the invention, the third speed is attained in the event of the failure at the first to third speeds, and the sixth speed is attained in the event of the failure at the fourth to sixth speeds. Therefore, even if the failure occurs during running of the vehicle, the gear is not shifted to the speed less than that attained during running. As a result, an abrupt engine brake can be prevented. Moreover, the third brake can be attained which provides great driving force sufficient to start the vehicle. Therefore, the minimum driving force required for running can be assured.

BRIEF DESCRIPTION OF THE DRAWINGS

The foregoing and further objects, features and advantages of the invention will become apparent from the following description of preferred embodiments with reference to the accompanying drawings, wherein:

FIG. 2 is a table showing operation of the gear train of the invention;

FIG. 7 is a table showing the relationship between fail-safe valve operation and engagement/disengagement of the engaging elements according to the invention;

FIG. 9 is a table showing operation of the gear train of the invention;

FIG. 13 is a table showing the relationship between fail-safe valve operation and engagement/disengagement of the engaging elements according to the invention.

DETAILED DESCRIPTION OF PREFERRED EMBODIMENTS

Figure 1:
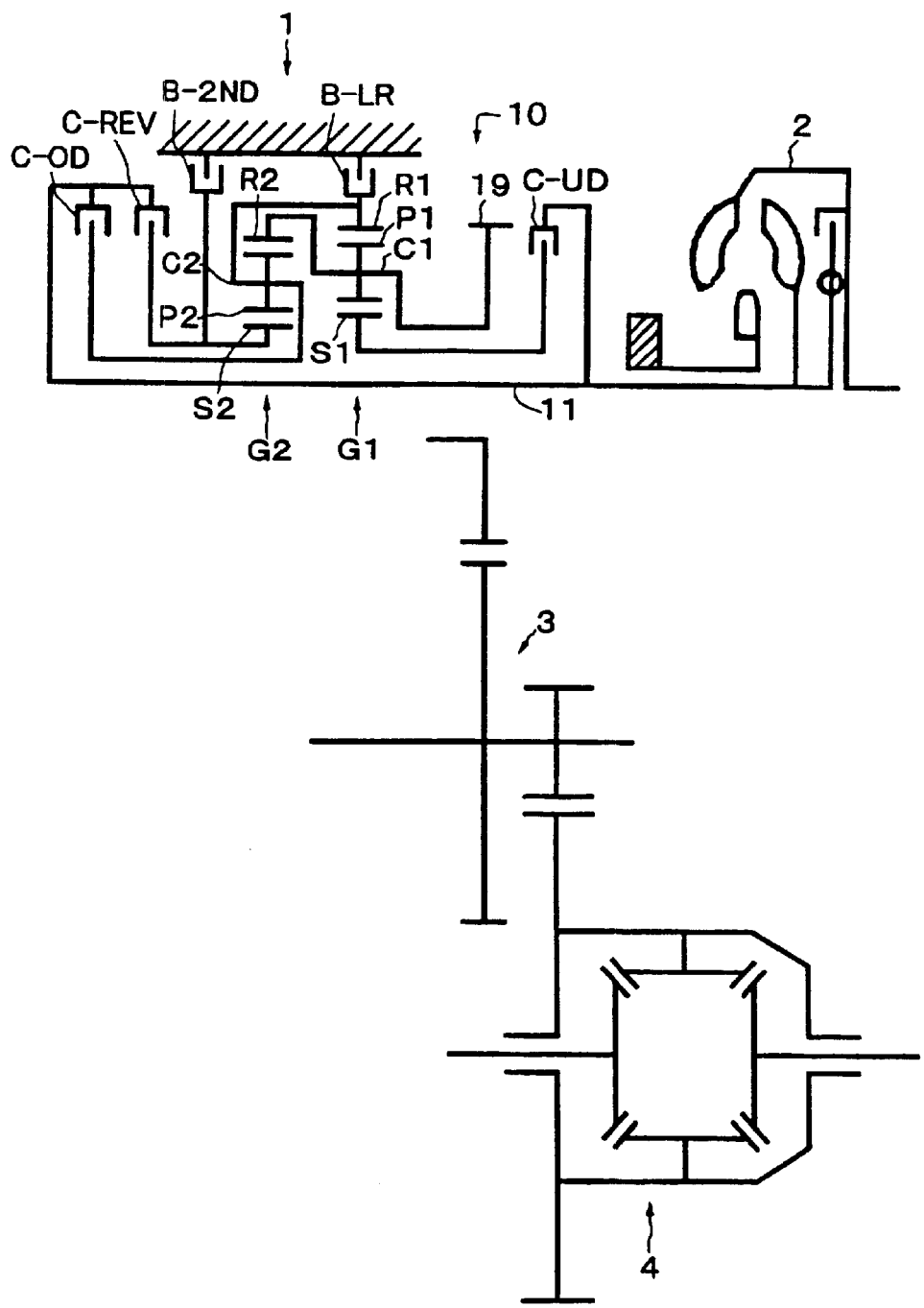
FIG. 1 is a skeleton diagram showing a gear train of the invention applied to a four-speed automatic transmission.

Hereinafter, the invention will be described with reference to the accompanying drawings. FIG. 1 is a skeleton diagram showing a gear train of the invention applied to an automatic transmission of forward 4 speeds and reverse 1 speed. In FIG. 1, the axles are shown unfolded in a common plane. As shown in the figure, this automatic transmission is a transaxle of three axles. More specifically, a torque converter 2 with a lock-up clutch and a planetary gear transmission 1 are provided on a first axle, a counter gear mechanism 3 is provided on a second axle, and differential gearing 4 is provided on a third axle. This automatic transmission is coupled to an engine (not shown) through the torque converter 2 that is provided on the front side of a power transmission path with respect to the planetary gear transmission 1. The automatic transmission is also coupled to right and left axles (not shown) through the counter gear mechanism 3 and the differential gearing 4 which are provided on the rear side of the power transmission path.

The planetary gear transmission 1 includes, as a main part, simple planetary gears G1 and G2. The planetary gear G1 is composed of the three elements: a sun gear S1; a pinion P1 meshing with the sun gear S1 and a carrier C1 supporting the pinion P1; and a ring gear R1 meshing with the pinion P1. Similarly, the planetary gear G2 is composed of the three elements: a sun gear S2; a pinion P2 meshing with the sun gear S2 and a carrier C2 supporting the pinion P2; and a ring gear R2 meshing with the pinion P2. In the planetary gear transmission 1, clutches and brakes are also provided as respective engaging elements of the above-mentioned elements in the planetary gears G1 and G2.

According to the planetary gears G1 and G2 of the planetary gear transmission 1, the carrier C1 is coupled to the ring gear R2 and the ring gear R1 is coupled to the carrier C2. The sun gear S1 of the planetary gear G1 is coupled, as a first input element, to an input shaft 11 through an under-drive clutch C-UD (hereinafter, simply referred to as "UD clutch"). The ring gear R2 and carrier C1 which are coupled to each other are coupled to a counter drive gear 19 as an output element. The carrier C2 and ring gear R1 which are coupled to each other are coupled, as a second input element, to the input shaft 11 through an over-drive clutch C-OD (hereinafter, simply referred to as "OD clutch"). The sun gear S2 of the planetary gear G2 is coupled, as a reverse input element, to the input shaft 11 through a reverse clutch C-REV (hereinafter, simply referred to as "REV clutch"). The ring gear R1 and carrier C2 serving as the second input element are stoppable to a transmission case 10 by a low-reverse brake B-LR (hereinafter, simply referred to as "LR brake") so as to function as a reaction element at the first speed (low) or during reverse. Moreover, the sun gear S2 serving as the reverse input element is stoppable to the transmission case 10 by a second brake B-2ND (hereinafter, simply referred to as "2ND brake") so as to function as a reaction element at the second speed (second).

According to the planetary gear transmission 1 structured as such, each of the above-mentioned clutches and brakes is provided with a hydraulic servo which is formed by a piston/cylinder mechanism for engaging and disengaging the clutches and brakes with and from respective friction-engaging members, as well known in the art. Each hydraulic servo engages and disengages the respective engaging member in response to supply and discharge of a hydraulic pressure to and from the hydraulic servo. The supply and discharge of the hydraulic pressure is controlled by a hydraulic control system provided in the transmission case 10. FIG. 2 is a table showing the relationship between actuation of each clutch and brake and the speed(s) attained thereby. In the figure, the mark O indicates engagement of a corresponding clutch or brake, and a blank indicates disengagement thereof.

In this gear train, the first speed (1ST) is attained by engagement of the UD clutch and the LR brake. At this time, an input, which is input from the input shaft 11 through the UD clutch to the sun gear S1, is output to the counter drive gear 19 as a reduced rotation of the carrier C1 against the ring gear R1 stopped by the LR brake.

The second speed (2ND) is attained by engagement of the UD clutch and the 2ND brake. At this time, an input, which is input from the input shaft 11 through the UD clutch to the sun gear S1, is output from the carrier C1 to the counter drive gear 19 as a differential rotation from the ring gear R1 rotating against the sun gear S2 stopped by the 2ND brake.

The third speed (3RD) is attained by simultaneous engagement of the UD and OD clutches. At this time, there are inputs, one of which is input from the input shaft 11 through the UD clutch to the sun gear S1 and another of which is input from the input shaft 11 through the OD clutch and the carrier C2 to the ring gear R1. As a result, the planetary gear G1 is directly coupled together, whereby the input at the carrier C1 is output to the counter drive gear 19 without reduction in speed.

Moreover, the fourth speed (4TH) is attained by engagement of the OD clutch and the 2ND brake. At this time, an input, which is input from the input shaft 11 through the OD clutch to the carrier C2, is output through the carrier C1 to the counter drive gear 19 as an increased rotation of the ring gear R2 against the sun gear S2 stopped by the 2ND brake.

Furthermore, the reverse (R) is attained by engagement of the REV clutch and the LR brake. At this time, an input, which is input from the input shaft 11 through the REV clutch to the sun gear S2, results in a reversed, reduced rotation of the ring gear R2 through the rotating pinion P2 supported by the carrier C2 which is stopped by the LR brake. Thus, the reversed, reduced rotation is output to the counter drive gear 19 through the carrier C1.

Figure 3:
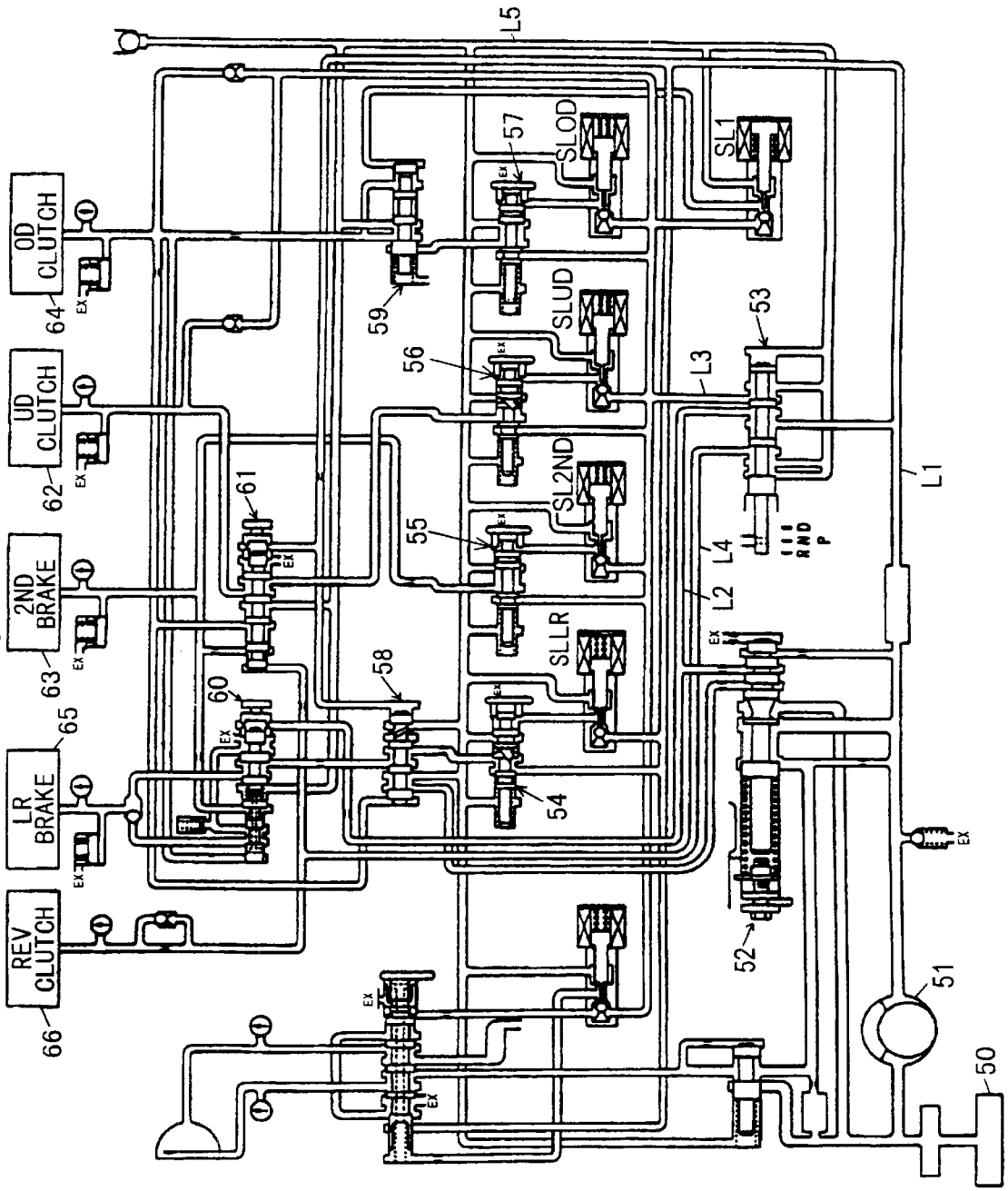
FIG. 3 is a circuit diagram showing a hydraulic control system of the invention.

Hereinafter, a structure of the hydraulic control system for attaining each speed shown in the table of FIG. 2 in the gear train of FIG. 1 is described. FIG. 3 is a circuit diagram of the hydraulic control system. In this hydraulic circuit, a hydraulic pressure is pumped from an oil pan 50 by an oil pump 51 into a line-pressure oil path L1. The hydraulic circuit adjusts the hydraulic pressure by appropriately draining the hydraulic pressure to another oil path(s) by a regulator valve 52, thereby creating a proper line pressure corresponding to the running load and speed of the vehicle. Based on the line pressure, the hydraulic circuit controls the pressure and direction by using a corresponding valve(s) within the circuit, thereby supplying and discharging the resultant hydraulic pressure to and from the respective hydraulic servos 62 to 66 of the engaging elements. This circuit is characterized in that the respective supply paths of the hydraulic servos of the clutches and brakes are provided with their own pressure-regulating valves and duty solenoid valves for individually controlling the respective regulating valves. However, the supply path of the hydraulic servo 66 of the REV clutch is not provided with such a pressure-regulating valve and duty solenoid valve.

The relationship between each valve and oil-path connection will now be described. First, the regulator valve 52 is a spool-type pressure-regulating valve. More specifically, a direct feedback pressure of the line pressure, a line pressure through a manual valve 53 and a line pressure through a switch valve 58 are applied opposite to the spring load as signal pressures to the regulator valve 52, and the regulator valve 52 responsively adjusts the degree of communication between an input port connected to the line-pressure path L1 and a drain port and an output port leading to the torque converter. At the normal line pressure, the degree of communication with the drain port is reduced, whereby the resultant excessive pressure is supplied mainly to the torque converter. On the other hand, as the applied signal pressure is increased, the degree of communication with the drain port is increased so as to increase the drain amount, thereby maintaining the line pressure at a prescribed value.

Next, the manual valve 53 is a spool valve for switching among the following three positions: position "R" for causing an input port connected to the line-pressure oil path L1 to communicate with a reverse-range (hereinafter, "R-range") output port, as well as causing other output ports to communicate with a drain oil path L5; position "N" for causing the input port to communicate with a neutral- (parking-) range (hereinafter, "N-range") output port, as well as causing other output ports to communicate with the drain oil path L5; and position "D" for causing the input port to communicate with the N-range output port and a drive-range (hereinafter, "D-range") output port, as well as causing other oil paths to communicate with the drain oil path L5. In the position "N", the line pressure is applied through the N-range oil path L2 to the regulator valve 52 and a first cut-off valve 60, which will be described in detail below, via respective orifices. In the position "D", the line pressure is applied through the D-range oil path L3 to each solenoid valve (SLLR, SL2ND, SLUD, SLOD), which will be described in detail below, and each control valve 54 to 57. In the position "R", the hydraulic pressure is supplied through the R-range oil path L4 to the hydraulic servo 66 of the REV clutch, as well as the signal pressure is applied through the R-range oil path L4 to a second cut-off valve 61, which will be described in detail below, via an orifice. It should be noted that the manual valve 53 is switched by manipulating the shift lever by the driver, as is well known in the art.

A supply path to the LR brake hydraulic servo 65 is formed by a low-reverse pressure control valve (hereinafter, simply referred to as "LR control valve") 54 and the duty solenoid valve (SLLR) for controlling the LR control valve 54 based on a duty-ratio signal from an electronic controller. The downstream side of the LR control valve 54 whose input port is connected to the D-range oil path L3 is connected to the LR brake hydraulic servo 65 through the switch valve 58 and the first cut-off valve 60. The LR control valve 54 is a spool-type pressure-regulating valve. More specifically, an output signal pressure (hereinafter, referred to as "solenoid pressure") of the solenoid valve (SLLR) is applied opposite to the spring load, and the LR control valve 54 responsively adjusts the degree of communication between the input and output ports. The solenoid valve (SLLR) is a normally-open duty solenoid valve for releasing a check ball while closing the drain port in response to the plunger actuated by the spring load. When the duty-ratio signal is applied, the solenoid valve (SLLR) causes suction of the plunger against the spring load, thereby rendering the check ball seated. Thus, the solenoid valve (SLLR) releases the solenoid pressure through communication between the output port and the drain oil path L5, while stopping the supply of the line pressure.

A supply path to the 2ND brake is formed by a second brake pressure control valve (hereinafter, simply referred to as "2ND control valve") 55 and the duty solenoid valve (SL2ND) for controlling the 2ND control valve 55 based on a duty-ratio signal from the electronic controller. The downstream side of the 2ND control valve 55 whose input port is connected to the D-range oil path L3 is connected to the 2ND brake hydraulic servo 63 and respective signal-pressure ports of the first and second cut-off valves 60 and 61 through respective orifices. The structure and function of the 2ND control valve 55 and the solenoid valve (SL2ND) in this supply path are essentially similar to those of the LR control valve 54 and the solenoid valve (SLLR). Therefore, description thereof is omitted for simplicity. Moreover, the same is applied to an under-drive pressure control valve (hereinafter, simply referred to as "UD control valve") 56, an over-drive pressure control valve (hereinafter, simply referred to as "OD control valve") 57, and respective duty solenoid valves (SLUD, SLOD) for controlling the UD and OD control valves. Therefore, description thereof is also omitted for simplicity.

In the supply path to the UD clutch, the downstream of the UD control valve 56 is connected to the UD clutch hydraulic servo 62 through the second cut-off valve 61.

In the supply path to the OD clutch, the downstream of the OD control valve 57 is connected to the OD clutch hydraulic servo 64 via an orifice through an over-drive supply relay valve 59. The over-drive supply relay valve 59 forms supply switching means as herein described. The downstream of the OD control valve 57 is further connected to the first cut-off valve 60 as well as to a signal pressure port of the switch valve 58 through an orifice.

A supply path to the REV clutch is the R-range oil path L4, which is connected to the signal pressure port of the second cut-off valve 61.

When the OD clutch is actuated, the switch valve 58 applies a signal pressure to the regulator valve 52 so as to reduce the line pressure at the third and fourth speeds. On the other hand, in the event of the failure, the switch valve 58 cuts off the supply of the hydraulic pressure from the LR control valve 54 to the LR brake hydraulic servo 65. Thus, the switch valve 58 is a spool-type switch valve for switching the supply path to the LR brake hydraulic servo 65 to communicate with the D-range oil path L3 or with the drain oil path L5, as well as for switching the signal-pressure application oil path to the regulator valve 52 to communicate with the drain oil path L5 or with the D-range oil path L3.

The over-drive supply relay valve 59 as the supply switching means is provided so as to allow supply of the hydraulic pressure to the OD clutch hydraulic servo 64 in response to application of a solenoid pressure from a normally closed duty solenoid valve SL1 serving as a solenoid valve as herein described. As specifically shown in FIG. 6, the over-drive supply relay valve 59 includes a spring-loaded spool 591 and a plunger 592. A signal-pressure port for applying the solenoid pressure to the plunger 59 is connected to the duty solenoid valve SL1. Between the plunger 592 and the spool 591, a signal-pressure port 593 for feeding back an apply pressure is connected to the downstream of the supply oil path. Thus, input/output ports 594 and 595 are made to communicate in response to the application of any one of the signal pressures. When both signal pressures are released, the output port 595 switches to communicate with the drain oil path L5 by the spring load. Moreover, the duty solenoid valve SL1 manipulates a check ball similar to that of the above-mentioned solenoid valves by using a plunger. However, the solenoid valve SL1 is different from the other solenoid valves in that the spring urges the plunger in the return direction. Therefore, the solenoid valve SL1 does not output a solenoid pressure during a signal-OFF period resulting from the failure.

Figure 4:
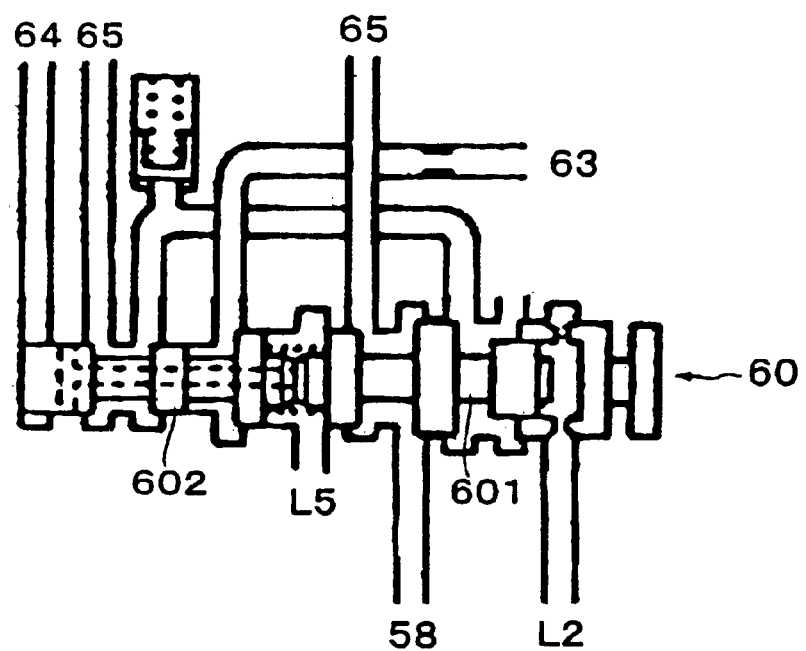
FIG. 4 is a diagram specifically showing a first cut-off valve in the circuit diagram of the invention.

The first cut-off valve 60, which forms a part of the switching means as herein described, is provided to release the hydraulic pressure of the LR brake hydraulic servo 65 in the event of the failure, and to change the oil path to the LR brake hydraulic servo 65 during the reverse period, thereby reducing the impact caused by shifting the gear. As specifically shown in an enlarged view of FIG. 4, this valve 60 is provided with a spring between one spool 601 and the other spool 602. The spool 601 has a three-step difference in diameter between the lands facing the input/output ports and the land of an end face pressure-receiving portion. The spool 602 has a difference in diameter between the lands located at both ends. The end face pressure-receiving portion of the spool 601 is connected to the N-range oil path L2. The differential-diameter pressure-receiving portion of the spool 601 is connected to the LR brake hydraulic servo 65 via a shuttle valve through an intra-valve oil path that is opened and closed by the spool 602. On the other hand, the differential-diameter pressure-receiving portion of the spool 602 is connected to the 2ND brake hydraulic servo 63, and the end face pressure-receiving portion of the spool 602 is connected to the OD clutch hydraulic servo 64. With such a structure and connection, the first cutoff valve 60 is actuated in response to the valve-opening force by the line pressure of the N-range oil path L2 which is applied to the end face pressure-receiving portion of the spool 601. At this time, however, due to the differential land diameter, the first cut-off valve 60 also receives the valve-closing force resulting from the apply pressure to the LR brake hydraulic servo 65. Therefore, when the first cut-off valve 60 receives the apply pressure to the 2ND brake hydraulic servo 63 at the differential-diameter pressure receiving portion, or receives the apply pressure to the OD clutch hydraulic servo 64 at the end face pressure-receiving portion, the input/output ports are closed. As a result, the output port is switched to communicate with the drain oil path L5.

Figure 5:
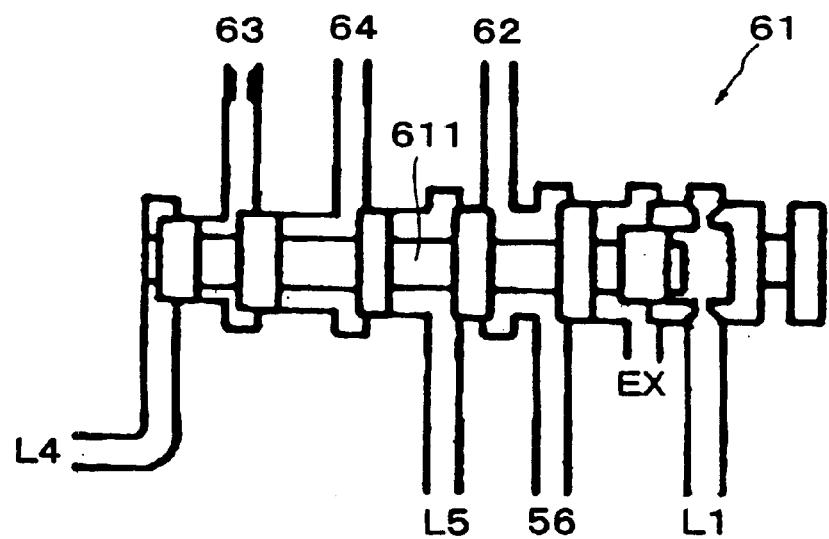
FIG. 5 is a diagram specifically showing a second cut-off valve in the circuit diagram of the invention.

The second cut-off valve 61, which forms another part of the switching means as herein described, is provided to cut off supply of the hydraulic pressure to the UD clutch hydraulic servo 62 in the event of the failure, thereby causing the output port to communicate with the drain oil path L5. As specifically shown in an enlarged view of FIG. 5, the second cut-off valve 61 includes a spool 611 having a difference in diameter between the lands facing the input/output ports. Respective hydraulic pressures of the line-pressure oil path L1 and the R-range oil path L4 are applied as signal pressures to both end face pressure-receiving portions of the spool 611. Moreover, to the three-step differential diameter pressure-receiving portions, an apply pressure of the 2ND brake hydraulic servo 63 and a hydraulic pressure of the OD clutch hydraulic servo 64 are applied as signal pressures in a manner opposite to the line pressure. With such a port structure, the second cut-off valve 61 receives, at the differential diameter portions of the intermediate two lands facing the input/output ports, the valve-closing force resulting from the apply pressure to the UD clutch hydraulic servo 62. Thus, the second cut-off valve 61 switches its output port to communicate with the output port of an UD control valve 56 of the UD clutch hydraulic servo 62 or to communicate with the drain oil path L5. Therefore, when the second cut-off valve 61 receives the respective apply pressures to the 2ND brake hydraulic servo 63, the OD clutch hydraulic servo 64, and the UD clutch hydraulic servo 62, receives the apply pressure to the OD clutch hydraulic servo 64, the input/output ports are closed. As a result, the output port is switched to communicate with the drain oil path L5.

It should be noted that each of the respective supply paths of the hydraulic servos of the clutches and brakes except for the REV clutch hydraulic servo 66 are provided with an accumulator. Although the various valves and oil paths for the torque converter are also shown in the figures, these elements do not relate to the subject matter of the invention. Therefore, description thereof is omitted.

According to the hydraulic circuit having the above-mentioned structure, a line pressure is output to the N-range oil path L2 when the manual valve 53 is in the position "N". This hydraulic pressure is applied to the regulator valve 52 through an orifice, as well as to the spool end of the first cut-off valve 60. Therefore, through the communication between the input/output ports of the first cut-off valve 60, the line pressure can be supplied to the LR brake hydraulic servo 65 through the line-pressure oil path L1, the LR control valve 54 and the switch valve 58. As shown in FIG. 2, the line pressure is supplied to the LR brake hydraulic servo 65 by rendering the solenoid valve (SLLR) non-conductive (hereinafter, simply referred to as "OFF"). Thus, the LR brake is engaged as shown in the table of FIG. 2. At this time, the hydraulic pressure is not output to the D-range and R-range oil paths L3 and L4. Therefore, the hydraulic pressure is not supplied to the other hydraulic servos.

When the manual valve 53 is switched to the position "D", the line pressure is output to the D-range oil path L3, in addition to the above-mentioned hydraulic-pressure supply. This line pressure is equally output to all of the supply paths for the clutches and brakes except for the REV clutch hydraulic servo 66. However, each of the control valves 54 to 57 in the supply paths, as such, does not allow the hydraulic pressure to be supplied to the respective hydraulic servos. The hydraulic pressure is supplied to the hydraulic servos by not applying the duty-ratio signal, which causes each solenoid valve to output the solenoid pressure, from the electronic controller. Therefore, according to this circuit structure, the gears can be freely shifted by the electric signal. However, the hydraulic pressure might be simultaneously supplied to all of the hydraulic servos due to the signal-OFF or the sticking of the solenoid valves.

Hereinafter, valve operation in the normal condition will be described for each speed. When application of the duty-ratio signal to the solenoid valve (SLUD) is stopped (hereinafter, simply referred to as "signal-OFF"), the UD control valve 56 adjusts the received pressure in response to the application of the solenoid pressure. The pressure thus adjusted is supplied as an apply pressure to the UD clutch hydraulic servo 62 through the second cut-off valve 61 having its input/output ports communicating with each other in response to the application of the line pressure. The apply pressure is supplied to the UD clutch hydraulic servo 62 while being, as appropriate, accumulated in the accumulator. On the other hand, in response to the signal-OFF of the solenoid valve (SLLR), the apply pressure adjusted based on the line-pressure of the line-pressure oil path L1 is supplied to the LR brake hydraulic servo 65 through the path as described with respect to the position "N". Thus, the UD clutch is engaged, achieving the first speed in cooperation with the stoppage of the LR brake.

The second speed is attained by signal-OFF of the solenoid valve (SLUD), application of the duty-ratio signal to the solenoid valve (SLLR) (hereinafter, simply referred to as "signal-ON"), and signal-OFF of the solenoid valve (SL2ND). In this state, the apply pressure is supplied to the UD clutch, as described above. Moreover, the 2ND control valve 55 adjusts the received pressure in response to the application of the solenoid pressure. The pressure thus adjusted is supplied as an apply pressure to the 2ND brake hydraulic servo 63, while being, as appropriate, accumulated in the accumulator. The apply pressure is also supplied to the first and second cut-off valves 60 and 61 through respective orifices. In this case, however, because of the signal-ON of the solenoid valve (SLLR), the LR control valve 54 does not output the apply pressure, and causes its output port to communicate with the drain oil path L5. Therefore, the hydraulic pressure of the LR brake hydraulic servo 65 is drained through the LR control valve 54. As a result, both the first and second cut-off valves 60 and 61 are not switched because of the difference in a pressure-receiving area. Thus, the second speed is attained by the engagement of the UD clutch and the reaction support of the 2ND brake.

The third speed is attained by the signal-OFF of the solenoid valve (SLUD), the signal-OFF of the solenoid valve (SLOD), the signal-ON of the solenoid valve (SL2ND), the signal-ON of the solenoid valve (SLLR) and the signal-ON of the solenoid valve (SL1). In this case as well, the apply pressure is supplied to the UD clutch hydraulic servo 62, as described above. Moreover, the OD control valve 57 adjusts the received pressure in response to the application of the solenoid pressure. Through the over-drive supply relay valve 59 (see FIG. 6) communicating in response to the application of the solenoid pressure from the solenoid valve (SL1), the pressure thus adjusted is supplied as an apply pressure to the OD clutch hydraulic servo 64, while being, as appropriate, accumulated in the accumulator. At the same time, this apply pressure is also supplied to the first cut-off valve 60 through the orifice. However, because of the signal-ON of the solenoid valve (SL2ND), the 2ND control valve 55 does not output the apply pressure, and causes its output port to communicate with the drain oil path L5. Therefore, the hydraulic pressure of the 2ND brake hydraulic servo 63 is drained through the 2ND control valve 55. In this case as well, the first cut-off valve 60 is not switched. Thus, the third speed is achieved by the direct coupling obtained from the engagement of the UD and OD clutches.

The fourth speed is attained by the signal-ON of the solenoid valve (SLUD), the signal-OFF of the solenoid valve (SLOD), the signal-OFF of the solenoid valve (SL2ND), the signal-ON of the solenoid valve (SLLR), and the signal-ON of the solenoid valve (SL1). In this state, the apply pressure is supplied to the OD clutch and 2ND brake hydraulic servos 64 and 63 in a manner similar to that in the case of the above-mentioned speeds. In this case, the respective apply pressures to the OD clutch and 2ND brake hydraulic servos 64 and 63 are both applied to the first cut-off valve 60, whereby the first cut-off valve 60 is switched. In this case, however, the LR control valve 54 is in a non-output state. Therefore, operation is not directly affected by such switching of the first cut-off valve 60. In addition, due to the signal-ON of the solenoid valve (SLUD), the UD control valve 56 does not output the apply pressure, and causes its output port to communicate with the drain oil path L5. Therefore, the apply pressure to the UD clutch hydraulic servo 62 is drained. Thus, the fourth speed is attained by engagement of the OD clutch and reaction-support of the 2ND brake.

Moreover, the reverse is directly conducted by supplying the apply pressure to the LR brake hydraulic servo 65 through the LR control valve 54 which is always supplying the line pressure, and by switching the manual valve 53. In this case, the line pressure output to the R-range oil path L4 is directly supplied to the REV clutch hydraulic servo 66 as the apply pressure. This line pressure is also applied to the second cut-off valve 61 through the orifice. In this case, the reverse resulting from reaction-support of the LR brake that has already been stopped is achieved.

Hereinafter, operation of the above-described hydraulic control system in the case of failure will be described. In the event of the failure, each of the normally-open solenoid valves is caused to output the solenoid pressure, as well as each of the control valves 54 to 57 is caused to supply the apply pressure, regardless of the speed attained at that time. Assuming that the failure occurs at the first speed, the apply pressure output from the 2ND control valve 55 is directly supplied to the 2ND brake hydraulic servo 63 without being interrupted by any valve. This apply pressure is applied to the first cut-off valve 60. The first cut-off valve 60 is switched by combination of the apply pressure thus applied, and the apply pressure of the LR brake hydraulic servo 65 within the valve 60. As a result, the apply pressure from the LR control valve 54 is blocked, and the apply pressure of the LR brake hydraulic servo 65 is drained. Similarly, the apply pressure of the 2ND control valve 55 is also supplied to the second cut-off valve 61. However, the second cut-off valve 61 is not switched due to the difference in a pressure-receiving area. Accordingly, supply of the apply pressure to the UD clutch hydraulic servo 62 is maintained. Moreover, the apply pressure of the OD control valve 57 is blocked by the over-drive supply relay valve 59 (see FIG. 6), and the OD clutch hydraulic servo 64 is drained through the over-drive supply relay valve 59. Thus, in the fail state, the 2ND brake is stopped with the UD clutch being engaged, and the other clutches and brakes are disengaged. As a result, the second speed as shown in the table of FIG. 2 is achieved.

At the second speed, the UD clutch and 2ND brake hydraulic servos 62 and 63 supply the apply pressure.

Therefore, in the case of the failure at the second speed, supply of the apply pressure to the LR brake and OD clutch hydraulic servos 65 and 64 must be considered. Because of the application of the apply pressure from the 2ND control valve 55, the respective switching positions of the first and second cut-off valves 60 and 61 are the same as in the case of the failure at the first speed. Moreover, the OD clutch hydraulic servo 64 is also in the same state as in the case of the failure at the first speed. Therefore, engagement of the UD clutch as well as stopping of the 2ND brake are maintained, whereas the other clutches and brakes are disengaged. Thus, the second speed is maintained as shown in the table of FIG. 2.

At the third speed, the apply pressure is supplied to the UD and OD clutches. Therefore, in the case of the failure at the third speed, supply of the apply pressure to the 2ND brake and LR brake hydraulic servos 63 and 65 must be considered. At the third speed, the second cut-off valve 61 receives the apply pressure to the OD clutch hydraulic servo 64 at the differential-diameter pressure-receiving portion. The second cut-off valve 61 also receives the apply pressure to the UD clutch hydraulic servo 62 at the differential-diameter pressure-receiving portion between the input/output ports. When the failure occurs in this state, the apply pressure from the 2ND control valve 55 is applied to the differential-diameter pressure-receiving portion between the input/output ports, and this hydraulic pressure is directly applied to the 2ND brake hydraulic servo 63. Moreover, the two apply pressures are both applied to the differential-diameter pressure-receiving portion of the second cut-off valve 61. Accordingly, due to the hydraulic pressures applied to the three-step differential-diameter portions, the second cut-off valve 61 is switched in the closing direction against the line pressure that is applied opposite to the hydraulic pressures. Thus, the second cut-off valve 61 blocks the supply of the apply pressure to the UD clutch hydraulic servo 62, causing its output port to communicate with the drain oil path L5. As a result, the engagement of the OD clutch and stoppage of the 2ND brake are achieved, whereby the third speed is changed to the fourth speed as shown in FIG. 2.

At the fourth speed, the OD clutch and 2ND brake hydraulic servos 64 and 66 should supply the apply pressure. Therefore, in the case of the failure at the fourth speed, supply of the apply pressure to the LR brake and UD clutch hydraulic servos 65 and 62 must be considered. Because of the application of the apply pressure from the 2ND control valve 55, the respective switching positions of the first and second cut-off valves 60 and 61 are the same as in the case of the failure at the third speed. Therefore, engagement of the OD clutch as well as stopping of the 2ND brake are maintained, whereas the other clutches and brakes are disengaged. Thus, the fourth speed is maintained as shown in the table of FIG. 2.

It should be noted that during the reverse, the line pressure itself is not supplied from the manual valve 53 to the D-range oil path L3, the reverse can be achieved regardless of the failure of each solenoid valve.

Moreover, in this circuit structure, the hydraulic pressure of the D-range oil path L3 may be drained as a result of pressure reduction caused by switching of the manual valve 53 or by the stop of the oil pump 51 due to the engine OFF. Once the hydraulic pressure has been drained, the hydraulic pressure is again supplied to each oil path when the manual valve 53 is switched back to the position "D". In this case as well, the first cut-off valve 60 is switched by combination of the apply pressure of the 2ND brake hydraulic servo 63 and the apply pressure of the LR brake hydraulic servo 65. Thus, the supply of the apply pressure to the LR brake hydraulic servo 65 is blocked by the first cut-off valve 60, whereas the supply of the apply pressure to the OD clutch hydraulic servo 64 is blocked by the over-drive supply relay valve 59. Therefore, the second cut-off valve 61 is not switched. As a result, engagement of the UD clutch and stoppage of the 2ND brake can be obtained, thereby attaining the second speed. Accordingly, the vehicle can both start and run at the second speed after it stops.

FIG. 7 is a table showing functions of the cut-off valves 60 and 61 with respect to the clutches and brakes. The first cut-off valve 60 functions to cut off the supply to the LR brake hydraulic servo 65 whenever the apply pressure to be supplied through the valve 60 itself to the LR brake hydraulic servo 65 combines with at least one of the other pressures to be supplied to the other hydraulic servos. The second cut-off valve 61 functions to cut off the supply to the UD clutch hydraulic servo 62 whenever the apply pressure to be supplied through the second cut-off valve 61 itself to the UD clutch hydraulic servo 62 acts in combination with two of the other pressures supplied to the other hydraulic servos. According to this operation, stoppage of the two brakes is always prevented in the event of the failure at each speed, whereby the gear train is not interlocked. Moreover, since engagement of the two engaging elements including any one of the clutches is assured, the state in which the vehicle is able to run can be obtained.

Figure 8:
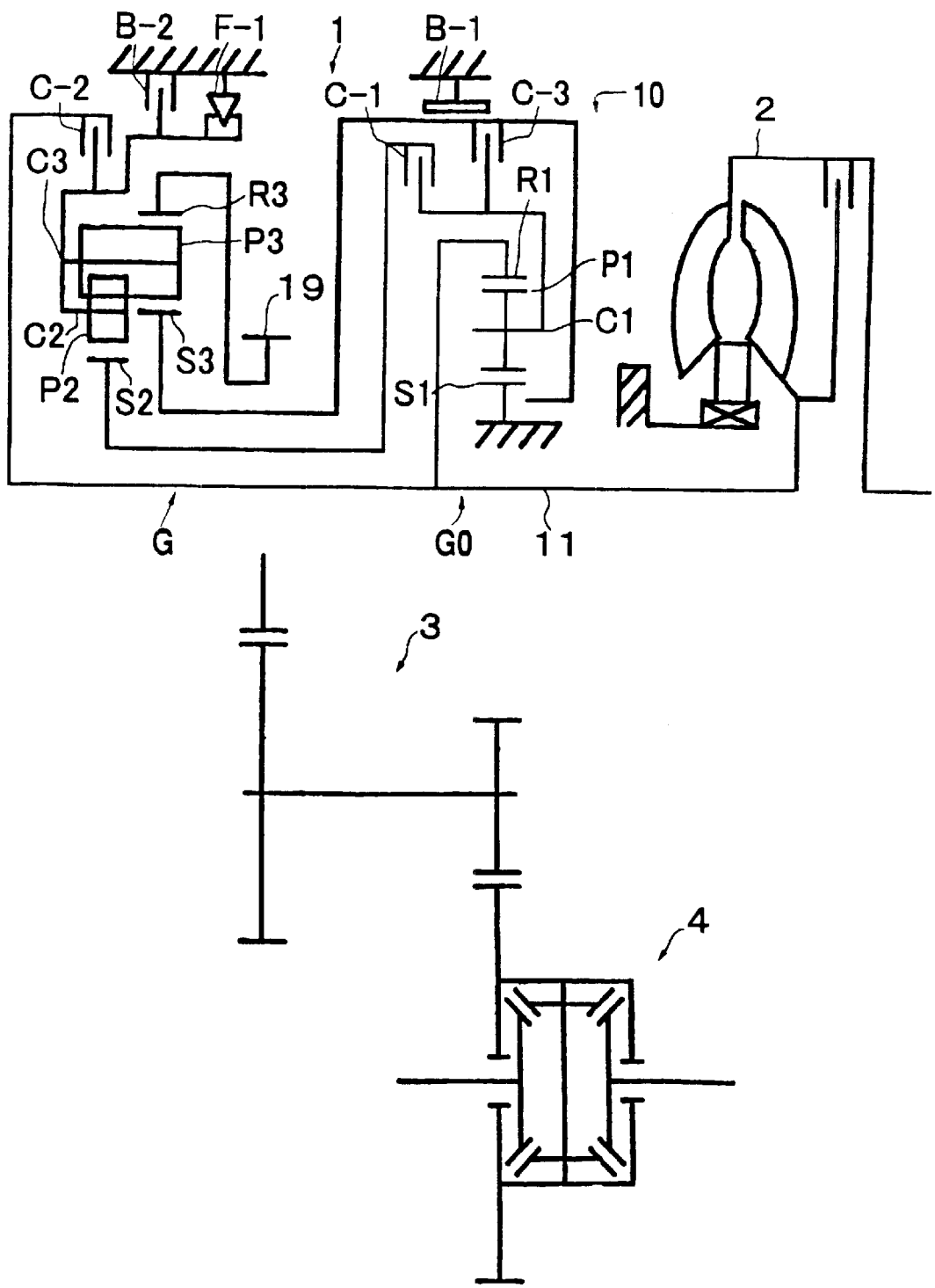
FIG. 8 is a skeleton diagram showing a gear train of the invention applied to a six-speed automatic transmission.

Hereinafter, a description of the invention applied to an automatic transmission of six forward speeds will be described. FIG. 8 shows a gear train in a skeleton diagram. In FIG. 8, the axles are shown unfolded in a common plane. This automatic transmission is also a trans-axle of three axles. More specifically, a torque converter 2 with a lock-up clutch and a planetary gear transmission 1 are provided on a first axle, a counter gear mechanism 3 is provided on a second axle, and differential gearing 4 is provided on a third axle. The planetary gear transmission 1 is coupled to an engine (not shown) through the torque converter 2 that is provided on the front side of a power transmission path. The planetary gear transmission 1 is also coupled to right and left axles (not shown) through the counter gear mechanism 3 and the differential gearing 4 which are provided on the rear side of the power transmission path.

In this automatic transmission, the planetary gear transmission 1 is constituted by a Ravigneaux type planetary gear set G and a reducing planetary gear G0 for applying a reduced rotation to the planetary gear set G. The planetary gear set G includes a small-diameter sun gear S2, a large-diameter sun gear S3, long pinions P3 meshing with each other and also with the large-diameter sun gear S2, a short pinion P2 meshing with the small-diameter sun gear S3, a carrier C2 (C3) supporting the pair of pinions, and a ring gear R3 meshing with the long pinion P3. Moreover, the reducing planetary gear G0 is constituted by a simple planetary gear composed of the three elements: a sun gear S1; a pinion P1 meshing the sun gear S1 and a carrier C1 supporting the pinion P1; and a ring gear R1 meshing with the pinion P1.

The large-diameter sun gear S3 of the planetary gear G is coupled to the carrier C1 of the reducing planetary gear G0 by a first clutch C1 (hereinafter, simply referred to as "C1 clutch"). The small-diameter sun gear S2 is coupled to the carrier C1 of the reducing planetary gear G0 by a third clutch C-3 (hereinafter, simply referred to as "C3 clutch"), and is also stoppable to a transmission case 10 by a first brake B-1 (hereinafter, simply referred to as "B1 brake"). Furthermore, the carrier C2 (C3) is coupled to an input shaft 11 by a second clutch C-2 (hereinafter, simply referred to as "C2 clutch") and is also stoppable to the transmission case 10 by a second brake B-2 (hereinafter, simply referred to as "B2 brake"). The ring gear R3 is coupled to the counter drive gear 19 as an output element. Moreover, a one-way clutch F-1 is located in parallel with the B2 brake. In the reducing planetary gear G0, the sun gear S1 is fixed to the transmission case 10, and the ring gear R1 is coupled to the input shaft 11. Moreover, the carrier C1 is coupled to the small-diameter sun gear S2 of the planetary gear set G through the C1 clutch, and is also coupled to the large-diameter sun gear S3 of the planetary gear set G through the C3 clutch.

Under the control of an electronic controller and a hydraulic control system which are not shown, the automatic transmission having the above-mentioned structure shifts the gears within a gear range selected by the driver, based on the load and speed of the vehicle. FIG. 9 is a table showing the speeds attained by engagement and disengagement of the clutches and brakes. In the figure, the mark O shows engagement of a corresponding clutch or brake, and a blank indicates disengagement thereof.

In this gear train, the first speed (1ST) is attained by engagement of the C1 clutch and the B2 brake. (As can be seen from the table, in the invention, automatic engagement of the one-way clutch F-1 is used instead of the engagement of the B2 brake. The reason why such automatic engagement is used as well as the reason why such automatic engagement corresponds to the engagement of the B2 brake will be described in detail below.) In this case, a rotation from the input shaft 11 is reduced through the reducing planetary gear G0, and the rotation thus reduced is input to the small-diameter sun gear S2 through the C1 clutch. As a result, a rotation of the ring gear R3, which is reduced at the maximum reduction ratio against the carrier C3 stopped by the engagement of the one-way clutch F-1, is output to the counter drive gear 19.

The second speed (2ND) is attained by engagement of the C1 clutch and the B1 brake. In this case, a rotation from the input shaft 11 is reduced through the reducing planetary gear G0, and the rotation thus reduced is input to the small-diameter sun gear S2 through the C1 clutch. As a result, a rotation of the ring gear R3, which is reduced against the large-diameter sun gear S2 stopped by the engagement of the B1 brake, is output to the counter drive gear 19. The reduction ratio of this rotation is smaller than that of the first speed (1ST).

The third speed (3RD) is attained by simultaneous engagement of the C1 and C3 clutches. In this case, a rotation from the input shaft 11 is reduced through the reducing planetary gear G0, and the rotation thus reduced is simultaneously input to the large-diameter sun gear S3 and the small-diameter sun gear S2 through the C3 and C1 clutches, respectively. As a result, the planetary gear set G is directly coupled together. Therefore, a rotation of the ring gear R3, which is the same as the input rotation to both sun gears S2 and S3, is output to the counter drive gear 19 as a rotation reduced with respect to that of the input shaft 11.

The fourth speed (4TH) is attained by simultaneous engagement of the C1 and C2 clutches. In this case, a rotation from the input shaft 11 is reduced through the reducing planetary gear G0, and the rotation thus reduced is input to the small-diameter sun gear S2 through the C1 clutch. On the other hand, the rotation of the input shaft 11 is also input through the C2 clutch to the carrier C3 without reduction. As a result, an intermediate rotation between the reduced and non-reduced input rotations is output to the counter drive gear 19 as a rotation of the ring gear R3 that is slightly reduced with respect to that of the input shaft 11.

The fifth speed (5TH) is attained by simultaneous engagement of the C2 and C3 clutches. In this case, a rotation from the input shaft 11 is reduced through the reducing planetary gear G0, and the rotation thus reduced is input to the large-diameter sun gear S3 through the C3 clutch. On the other hand, the rotation from the input shaft 11 is input through the C2 clutch to the carrier C3 without reduction. As a result, a rotation of the ring gear R2 that is slightly increased with respect to that of the input shaft 11 is output to the counter drive gear 19.

The sixth speed (6TH) is attained by engagement of the C2 clutch and the B1 brake. In this case, a rotation from the input shaft 11 is input only to the carrier C2 through the C2 clutch without reduction. As a result, a rotation of the ring gear R3, which is further increased against the small-diameter sun gear S2 stopped by the engagement of the B1 brake, is output to the counter drive gear 19.

The reverse (REV) is attained by engagement of the C3 clutch and the B2 brake. In this case, a rotation from the input shaft 11 is reduced through the reducing planetary gear G0, and the rotation thus reduced is input to the large-diameter sun gear S3 through the C3 clutch. As a result, a rotation of the ring gear R2, which is reversed against the carrier C2 stopped by the engagement of the B2 brake, is output to the counter drive gear 19.

Hereinafter, the above-mentioned relationship between the one-way clutch F-1 and the B2 brake will be described. As can be seen from the engagement and disengagement of the B1 and B2 brakes at the first and second speeds, the gears are shifted between the first and second speeds by disengaging one of the brakes simultaneously with engaging the other brake. In other words, engagement is shifted from one engaging element to the other. Such shifting of the engagement requires precise simultaneous control of the engaging and disengaging pressures of the hydraulic servos for manipulating the engaging elements, thereby requiring an increased number of control valves as well as complicating the hydraulic circuit. In the second embodiment, by utilizing the fact that the reaction torque applied to the carrier C2 (C3) is reversed between the first and second speeds, the engagement direction of the one-way clutch F-1 is matched with the supporting direction of the reaction torque at the first speed. Thus, the one-way clutch F-1 functions substantially equivalently to the engagement of the B2 brake, thereby stopping the carrier C2 (C3) instead of the engagement of the B2 brake at the first speed. (It should be noted that, in a wheel-driven vehicle coast state, the direction of the reaction torque applied to the carrier C2 (C3) is reversed with respect to that in an engine-driven state. Therefore, in order to obtain an engine brake, engagement of the B2 brake is required as shown by the mark Δ in FIG. 9.) Thus, according to the invention, the first speed may also be attained by engagement of the B2 brake without provision of the one-way clutch.

Figure 10:
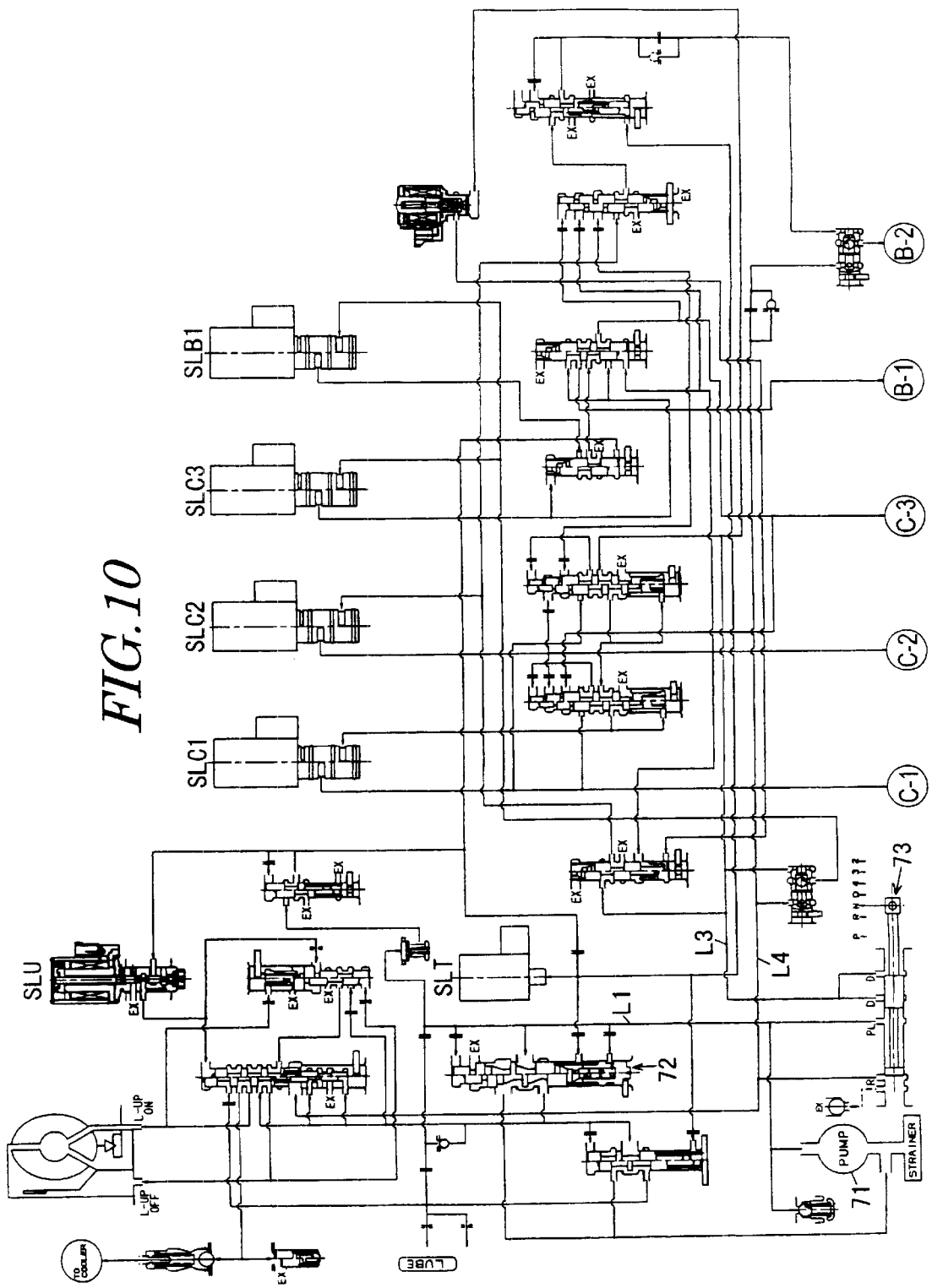
FIG. 10 is a circuit diagram showing a hydraulic control system of the invention.
Figure 11:
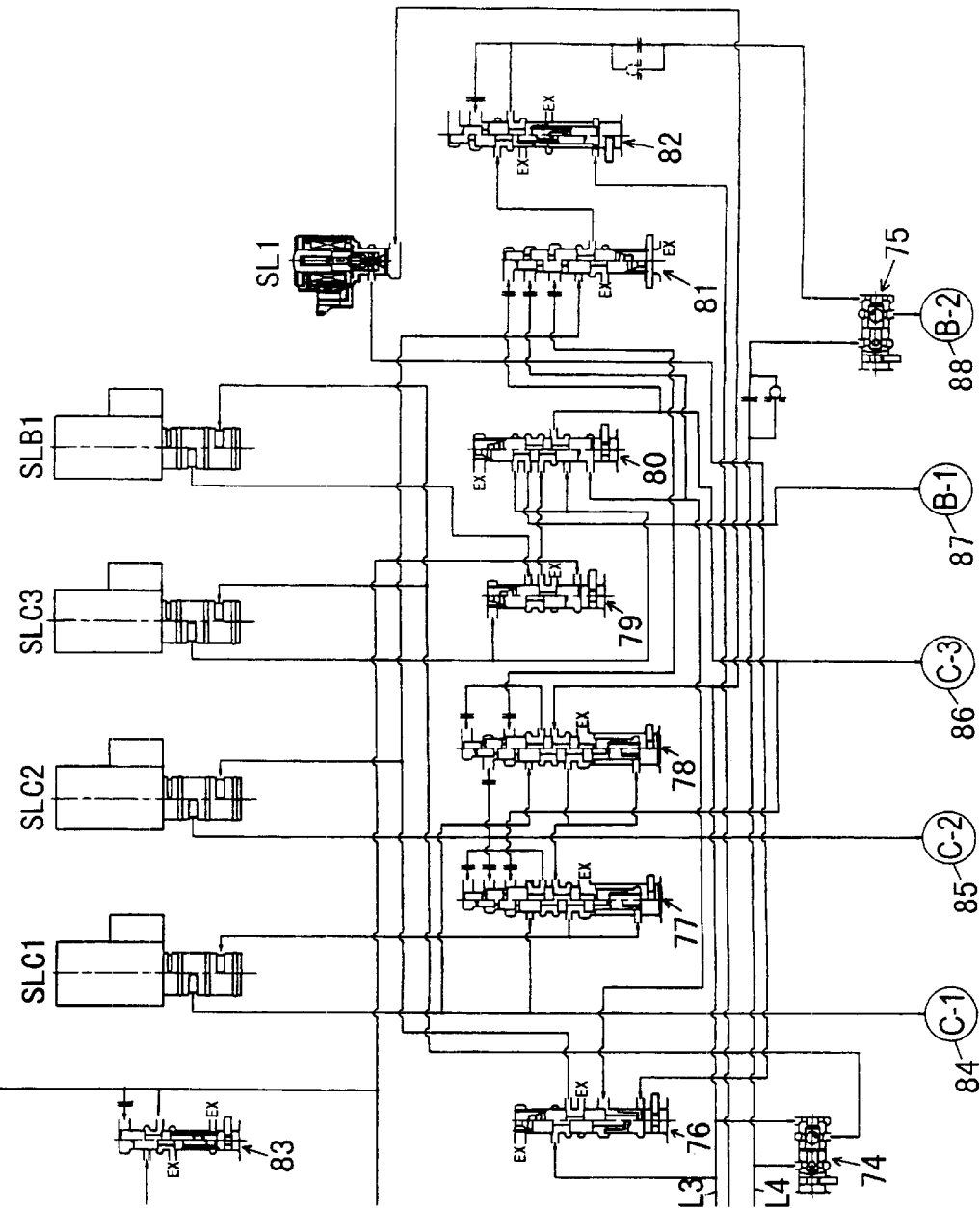
FIG. 11 is a partial enlarged view showing the hydraulic control system of the invention.

Hereinafter, a structure of the hydraulic control system for attaining each speed shown in the table of FIG. 9 in the gear train of FIG. 8 will be described. FIG. 10 is a circuit diagram of the hydraulic control system, and FIG. 11 is an enlarged view showing only the portions involved in shifting the gears. In this hydraulic circuit, a hydraulic pressure is pumped by an oil pump 71 into a line-pressure oil path L1. The hydraulic circuit adjusts the hydraulic pressure by appropriately draining the hydraulic pressure to another oil path(s) by a primary regulator valve 72, thereby creating a proper line pressure corresponding to the running load and speed of the vehicle. Based on the line pressure, the hydraulic circuit controls the pressure and direction by using a corresponding valve(s) within the circuit, thereby supplying and discharging the resultant hydraulic pressure to and from the respective hydraulic servos of the engaging elements. This circuit is characterized in that the respective supply paths to the hydraulic servos of the clutches and brakes are provided with their own duty solenoid valves.

The relationship between each valve and oil-path connection will now be described. First, the primary regulator valve 72 is a pressure-regulating valve including a spool and a plunger. More specifically, a direct feedback pressure of the line pressure is applied opposite to the spring load, as well as a throttle pressure is applied opposite to the line pressure as a signal pressure from a duty solenoid valve (SLT). Thus, the primary regulator valve 72 responsively adjusts the degree of communication between an input port connected to the line-pressure path L1 and a drain port and an output port connected to a secondary regulator valve. At the proper line pressure, the degree of communication with the drain port is reduced, whereby the resultant excessive pressure is supplied mainly to the secondary regulator valve. On the other hand, as the applied signal pressure is increased, the degree of communication with the drain port is increased so as to increase the drain amount, thereby maintaining the line pressure at a prescribed value.

The manual valve 73 is a spool valve for switching among the following seven positions: position "P" for closing an input port connected to the line oil path L1; position "R" for causing the input port to communicate with an R-range output port and draining other output ports; position "N" for closing the input port to all of the output ports; positions "D", "4" and "3" for causing the input port to communicate with a D-range output port, draining the R-range output port and closing a second D-range output port; and position "2" for causing the input port to communicate with both the D-range output port and the second D-range output port and draining the R-range output port. In the position "D", the manual valve 73 supplies a line pressure through the D-range oil path L3 to the respective hydraulic servos of the B 1 brake, C1 clutch, C2 clutch and C3 clutch. In the position "R", the manual valve 73 supplies a hydraulic pressure to the B2 brake hydraulic servo, and duty solenoid valves (SLB1, SLC3) through the R-range oil path L4. It should be noted that the manual valve 73 is switched by manipulating the shift lever by the driver, as well known in the art.

As shown in an enlarged view in FIG. 11, each of the respective supply paths to the hydraulic servos 84 to 88 of the clutches and brakes according to the invention is basically provided only with a duty solenoid valve for adjusting and releasing the apply pressure to the respective hydraulic servo. The fail-safe valves provided downstream of the duty solenoid valves in FIG. 3 are provided upstream thereof in FIG. 11.

More specifically, the supply path to the B1 brake hydraulic servo 87 is formed by the duty solenoid valve (SLB1) for adjusting a pressure based on the duty-ratio signal from the electronic controller. The solenoid valve (SLB1) has an input port connected through a shuttle valve 74 to the D-range oil path L3 and the R-range oil path L4. An output port of the solenoid valve (SLB1) is connected to the hydraulic servo 87 through a B1-C3 release valve 79 and a B1-C3 relay valve 80. The B1-C3 relay valve 80 serves as a shifting valve as herein described. The solenoid valve (SLB1) is a normally-open duty solenoid valve for releasing a check ball while closing the drain port in response to the plunger actuated by the spring load. When a duty-ratio signal is OFF, the solenoid valve (SLB1) causes suction of the plunger against the spring load, thereby rendering the check ball seated. Thus, the solenoid valve (SLB1) releases the solenoid pressure through communication between the output port and a drain oil path, while stopping supply of the line pressure.

The supply path to the C1 clutch hydraulic servo 84 is formed by a similar duty solenoid valve (SLC1) for similarly adjusting a pressure based on the duty-ratio signal from the electronic controller. An input port of the solenoid valve (SLC1) is connected to the D-range oil path L3 through first and second C1 cut-off valves 77 and 78.

A solenoid valve (SLC2) in the supply path to the C2 clutch hydraulic servo 85 is also a similar duty solenoid valve. An input port of the solenoid valve (SLC2) is connected to the D-range oil path L3 through a C2 supply relay valve 76. The C2 supply relay valve 76 forms supply switching means as herein described.

A solenoid valve (SLC3) in the supply path to the C3 clutch hydraulic servo 86 is also a similar duty solenoid valve. An input port of the solenoid valve (SLC3) is connected through the shuttle valve 74 to the D-range oil path L3 and the R-range oil path L4. Accordingly, the respective input ports of the solenoid valves (SLC3, SLB1) are connected to respective oil paths branched on the downstream side of the shuttle valve 74.

The supply path to the B2 brake hydraulic servo 88 is different from the other supply paths. More specifically, the hydraulic servo 88 is directly connected to the R-range oil path L4 through a shuttle valve 75. The other oil path of the hydraulic servo 88 through the shuttle valve 75 is connected to the D-range oil path L3 through a B2 control valve 82, a B2 cut-off valve 81 and the C2 supply relay valve 76.

The first C1 cut-off valve 77 forming a part of switching means in the invention is provided to cut off the line-pressure supply to the solenoid valve (SLC1). The first C1 cut-off valve 77 includes a spool having pressure-receiving portions with a two-step difference in land diameter, and a plunger abutting on the spool with a spring load. An input port of the first C1 cut-off valve 77 is connected to an output port of the second C1 cut-off valve 78. An output port of the first C1 cut-off valve 77 is connected to an input port of the solenoid valve (SLC1), and is also connected to feedback the line pressure to the spring-load side of its own plunger. The pressure-receiving portions of the spool end can communicate with the input port of the solenoid valve (SLC1) and an apply pressure oil path located downstream of the solenoid valve (SLC1), according to the switching of its own spool. One of the differential-diameter pressure-receiving portions is connected to an apply-pressure oil path of the C2 clutch hydraulic servo 85 through an orifice, whereas the other is connected to an apply-pressure oil path of the C3 clutch hydraulic servo 86 through an orifice.

The second C1 cut-off valve 78 which also forms a part of the switching means is structured similarly to the first C1 cut-off valve 77. An input port of the valve 78 is connected to the line-pressure oil path L1. An output port of the valve 78 is connected to the input port of the first C1 cut-off valve 77, and is also connected to feedback the line pressure to the spring-load side of its own plunger. The pressure-receiving portions of the spool end can communicate with the input port of the solenoid valve (SLC1) and an apply-pressure oil path located downstream of the solenoid valve (SLC1), according to the switching of its own spool. One of the differential-diameter pressure-receiving portions is connected to the apply-pressure oil path of the C2 clutch hydraulic servo 85 through an orifice. The other is connected to an apply-pressure oil path of the B1 brake hydraulic servo 87 through an orifice, as well as to a differential-diameter pressure-receiving portion of the B2 cut-off valve 81.

The B1-C3 release valve 79 forming another switching means is a switching valve of a spring-loaded spool. An input port of the B1-C3 release valve 79 is connected to the output port of the solenoid valve (SLB1), and an output port of the B1-C3 release valve 79 is connected to an input port of the B1-C3 relay valve 80. A spool end of the B1-C3 release valve 79 is connected to a solenoid modulator valve 83, and a spring-loaded end of the B1-C3 release valve 79 is connected to an output oil path of the solenoid valve (SLC3).

The B1-C3 relay valve 80 forming a shifting valve is a switching valve of a spring-loaded spool. A first input port of the B1-C3 relay valve 80 is connected to the output port of the B1-C3 release valve 79. Second and third input ports of the B1-C3 relay valve 80 are connected to an output port of the solenoid valve (SLC3). A first output port of the B1-C3 relay valve 80 is connected to the apply-pressure oil path of the C3 clutch hydraulic servo 86, as well as to a pressure-receiving portion at the spool end of the B2 cut-off valve 81. A second output port of the B1-C3 relay valve 80 is connected to the apply-pressure oil path of the B1 brake hydraulic servo 87. A spool end of the B1-C3 relay valve 80 is connected to the solenoid modulator valve 83, and a spring-loaded end of the B1-C3 relay valve 80 is connected to the output oil path of the solenoid valve (SLC3). The pressure-receiving portion at the spool end of the B1-C3 relay valve 80 is connected to the apply-pressure oil path of the C2 clutch hydraulic servo 85.

Figure 12:
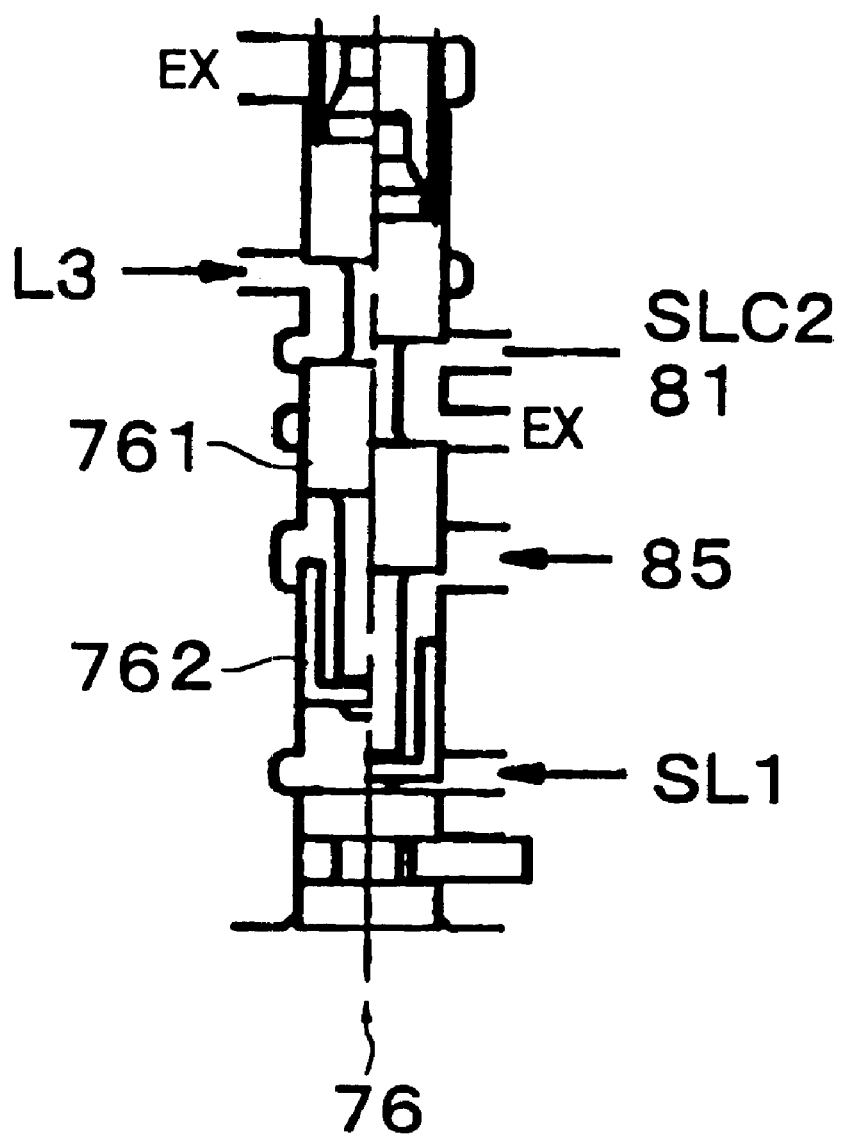
FIG. 12 is a diagram specifically showing a C2 supply relay valve of the invention.

As specifically shown in an enlarged view of FIG. 12, the C2 supply relay valve 76 serving as supply switching means is a switching valve including a spring-loaded spool 761 and a plunger 762 abutting on a spool end. An input port of the C2 supply relay valve 76 is connected to the D-range oil path L3, whereas an output port of the C2 supply relay valve 76 is connected to the respective input ports of the solenoid valve (SLC2) and the B2 cut-off valve 81. Moreover, a pressure-receiving portion at the spool end of the C2 supply relay valve 76 is connected to the apply-pressure oil path of the C2 clutch hydraulic servo 85, whereas a pressure-receiving portion at a plunger end of the C2 supply relay valve 76 is connected to an output port of a solenoid valve (SL1). Accordingly, the C2 supply relay valve 76 causes the input/output ports to communicate with each other, in response to the application of a signal pressure to any one of the pressure-receiving portions.

The B2 cut-off valve 81 forming different switching means is a switching valve of a spool having spring-loaded differential-diameter pressure-receiving portions. An input port of the B2 cut-off valve 81 is connected to the output port of the C2 supply relay valve 76, and an output port of the B2 cut-off valve 81 is connected to the input port of the B2 control valve 82. Moreover, a pressure-receiving portion at a spool end is connected to the apply-pressure oil path of the C3 clutch hydraulic servo 86. A differential-diameter pressure-receiving portion of the spool end is connected to the apply-pressure path of the C2 clutch hydraulic servo 85. A pressure-receiving portion behind the land is connected to the apply-pressure path of the B1 brake hydraulic servo 87.

The B2 control valve 82 is a pressure-regulating valve including a spool and a plunger, the spool and plunger abutting on each other through a spring. An input port of the B2 control valve 82 is connected to the output port of the B2 cut-off valve 81, and an output port of the B2 control valve 82 is connected to the B2 brake hydraulic servo 88 through the shuttle valve 75. A differential-diameter pressure-receiving portion of the B2 control valve 82 is connected to the output port of the B2 control valve 82 through an orifice, thereby achieving a feedback pressure-receiving portion. A pressure-receiving portion at a plunger end is connected to an output oil path of the duty solenoid valve (SLT) so as to receive a throttle pressure.

Figure 6:
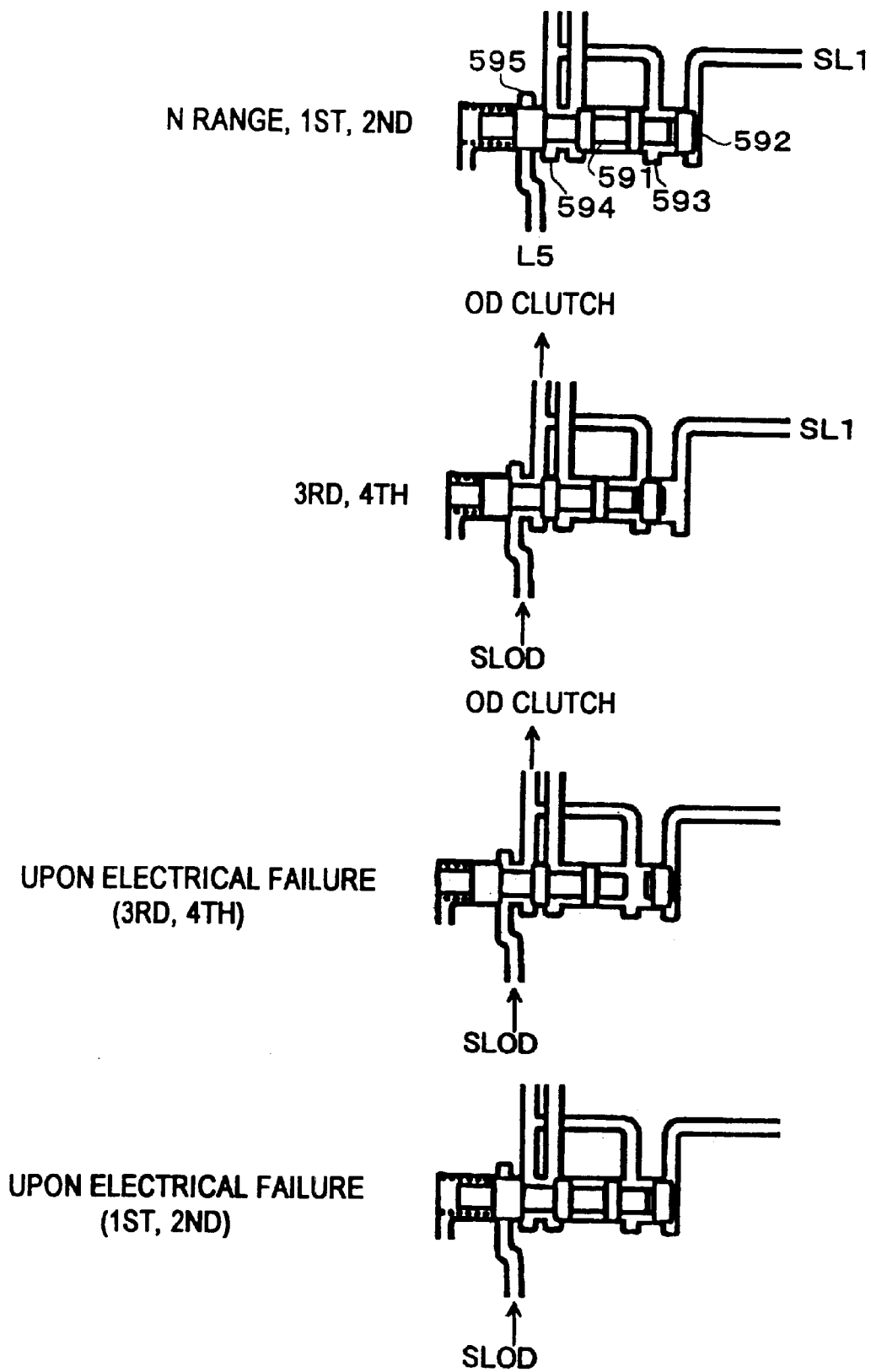
FIG. 6 is a diagram illustrating operation of an OD supply relay valve in a hydraulic circuit of the invention.

Unlike the other duty solenoid valves, the solenoid valve (SL1) is a normally-closed duty solenoid valve having a similar structure to that of the solenoid valve (SL1) as shown in FIG. 6. An input port of the solenoid valve (SL1) is connected to the D-range oil path L3, whereas an output port of the valve (SL1) is connected to the pressure-receiving portion at the spool end of the C2 supply relay valve 76.

It should be noted that, although the circuitry for the torque converter is shown in the overall circuit diagram of FIG. 10, such circuitry is not relevant to the subject matter of the invention. Therefore, description thereof will be omitted.

According to the hydraulic circuit having the above-described structure, when the manual valve 73 is in the position "N", the input port of the manual valve 73 connected to the line-pressure oil path L1 is closed at the land, whereas all of the output ports are drained. Therefore, only a modulator pressure, which is output from the solenoid modulator valve 83 directly connected to the line-pressure oil path L1, is applied to the pressure-receiving portion at the plunger end of the B1-C3 release valve 79. Thus, the B1-C3 release valve 79 positioned in the left half of FIG. 11, connects the output of the solenoid valve (SLB1) to the B1 brake hydraulic servo 87 through the B1-C3 relay valve 80 which is positioned in the right half of FIG. 11 in the absence of the hydraulic pressure. However, the solenoid valve (SLB1) is drained due to the signal-ON. Therefore, the B1 brake is not engaged. The same can be applied to the position "P" of the manual valve 73, although the spool position is different.

When the manual valve 73 is switched to the position "D", the line pressure is output to the D-range oil line L3. Accordingly, a hydraulic pressure is supplied to the solenoid valves (SLB1, SLC3) through the shuttle valve 74. The hydraulic pressure is also supplied to the solenoid valve (SLC1) through the second and first cut-off valves 78 and 77 positioned in the right half of FIG. 11. However, the supply of the hydraulic pressure to the solenoid valve (SLC2) is interrupted and drained by the C2 supply relay valve 76 positioned in the right half of FIG. 11. In this case as well, this, as such, does not allow the hydraulic pressure to be supplied to each hydraulic servo. The hydraulic pressure is supplied to each hydraulic servo by achieving the signal-OFF to each solenoid. Therefore, according to this circuit structure, the gears can be freely shifted by the electric signal. However, the hydraulic pressure might be simultaneously supplied to all of the hydraulic servos except for the C2 clutch hydraulic servo 85 due to the signal-OFF or the sticking of the solenoid valve(s).

Hereinafter, valve operation in the normal condition will be described. When the signal-OFF of the solenoid valve (SLC1) is conducted, the solenoid valve (SLC1) adjusts the received line pressure. The line pressure thus adjusted is supplied to the C1 clutch hydraulic servo 84 as an apply pressure. Thus, the C1 clutch is engaged, thereby achieving the first speed in cooperation with the one-way clutch F-1. At this time, the apply pressure is applied to the respective pressure-receiving portion at the spool ends of the first and second cut-off valves 77 and 78. However, both valves 77 and 78 receiving the spring load and the feedback pressure from the opposite directions are not switched. Moreover, in the case where an engine brake is required, the signal-ON of the solenoid valve (SL1) is conducted. As a result, the spool 761 of the C2 supply relay valve 76 is switched to the left side in FIGS. 11 and 12, connecting the D-range oil path L3 to the input port of the B2 cut-off valve 81. At this time, the solenoid valve (SLC2) also receives the D-range pressure from the D-range oil path L3 at its input port. However, because of the signal-OFF of the solenoid valve (SLC2), the hydraulic pressure is not supplied to the C2 clutch hydraulic servo 85. Accordingly, the apply pressure to the C2 clutch hydraulic servo 85 is not supplied to the B2 cut-off valve 81, whereby the B2 cut-off valve 81 is not switched. As a result, the B2 control valve 82 adjusts the D-range pressure, supplying the hydraulic pressure to the B2 brake hydraulic servo 88. Thus, the B2 brake is engaged.

The second speed is attained by the signal-OFF of the solenoid valve (SLC1) and the signal-OFF of the solenoid valve (SLB1). In this state, the apply pressure is supplied to the C1 clutch hydraulic servo 84 as described above. Moreover, the solenoid valve (SLB1) adjusts the received pressure. The pressure thus adjusted is supplied as an apply pressure to the B1-C3 release valve 79. The B1-C3 release valve 79 is positioned in the left half of FIG. 11 due to the modulator pressure as described above. Thus, the apply pressure is further supplied from the B1-C3 release valve 79 to the B1 brake hydraulic servo 87 through the B1-C3 relay valve 80 positioned in the right half of FIG. 11. Thus, the second speed is achieved by the engagement of the C1 clutch and the reaction support of the B1 brake. It should be noted that, in this state, the apply pressure of the C1 clutch hydraulic servo 84 is supplied to the pressure-receiving portion at the spool end of the second C1 cut-off valve 78, and the apply pressure of the B1 brake hydraulic servo 87 is supplied to the differential-diameter pressure-receiving portion of the C1 cut-off valve 78. However, in this case as well, both the first and second cut-off valves 77 and 78 receiving the spring load and the feedback pressure from the opposite directions are not switched.

The third speed is attained by the signal-OFF of the solenoid valve (SLC1) and the signal-OFF of the solenoid valve (SLC3). In this case, the apply pressure is supplied to the C1 clutch hydraulic servo 84, as described above. Moreover, the solenoid valve (SLC3) adjusts the received pressure. The pressure thus adjusted is supplied as an apply pressure to the spring-loaded pressure-receiving portion of the B1-C3 release valve 79. Thus, the B1-C3 release valve 79 is switched to the right half in FIG. 11 against the modulator pressure. Thus, the apply pressure of the B1 brake hydraulic servo 87 is drained, and the apply pressure for the C3 clutch hydraulic servo 86 is instead supplied to the C3 clutch hydraulic servo 86 through the B1-C3 relay valve 80. Thus, the third speed is attained by simultaneous engagement of the C1 and C3 clutches.

The fourth speed is attained by the signal-OFF of the solenoid valve (SLC1), the signal-OFF of the solenoid valve (SLC2), and the signal-ON of the solenoid valve (SL1). In this case, the apply pressure is supplied to the C1 clutch hydraulic servo 84, as described above. Moreover, the hydraulic pressure output from the solenoid valve (SL1) is applied to the pressure-receiving portion at the plunger end of the C2 supply relay valve 76. As a result, the C2 supply relay valve 76 is switched to the left half in FIG. 11, whereby the hydraulic pressure of the D-range oil path L3 is output through the C2 supply relay valve 76 to the solenoid valve (SLC2). Accordingly, the solenoid valve (SLC2) adjusts the received pressure, and the pressure thus adjusted is supplied as an apply pressure to the C2 clutch hydraulic servo 85. This apply pressure is also applied to the pressure-receiving portion at the spool end of the C2 supply relay C2 supply relay valve 76, as well as to the pressure-receiving portion at the spool end of the B1-C3 relay valve 80 and the differential-diameter pressure-receiving portion of the B2 cut-off valve 81. Thus, the B1-C3 relay valve 80 is switched to the left half in FIG. 11, whereby the C3 brake hydraulic servo 86 is drained through the B1-C3 relay valve 80 and the B1-C3 release valve 79. Thus, the fourth speed is attained by simultaneous engagement of the C1 and C2 clutches.

The fifth speed is attained by the signal-OFF of the solenoid valve (SLC2), the signal-OFF of the solenoid valve (SLB1) and the signal-ON of the solenoid valve (SL1). In this state, the hydraulic pressure output from the solenoid valve (SL1) is applied to the pressure-receiving portion at the plunger end of the C2 supply relay valve 76, as described above. Therefore, the C2 supply relay valve 76 is switched to the left half in FIGS. 11 and 12, whereby the hydraulic pressure of the D-range oil path L3 is output through the C2 supply relay valve 76 to the solenoid valve (SLC2). As a result, the solenoid valve (SLC2) adjusts the received pressure, and the pressure thus adjusted is applied as an apply pressure to the C2 clutch hydraulic servo 85. This apply pressure is also applied to the pressure-receiving portion at the spool end of the C2 supply relay valve 76, as well as to the pressure-receiving portion at the spool end of the B1-C3 relay valve 80 and the differential-diameter pressure-receiving portion of the B2 cut-off valve 81. Thus, the B1-C3 relay valve 80 is switched to the left half in FIG. 11. On the other hand, the solenoid valve (SLB1) originally receives the hydraulic pressure through the shuttle valve 74. Therefore, the solenoid valve (SLB1) adjusts the received pressure in response to the signal-OFF of the valve (SLB1). The pressure thus adjusted is supplied as an apply pressure to the C3 clutch hydraulic servo 86 through the B1-C3 release valve 79 and the B1-C3 relay valve 80, both positioned in the left half in FIG. 11. On the other hand, since the second C1 cut-off valve 78 connected to the D-range oil path L3 is positioned in the right half in FIG. 11, the hydraulic pressure is applied to the first C1 cut-off valve 77. The first C1 cut-off valve 77 receives the apply pressure of the C2 clutch hydraulic servo 85 at one of the differential-diameter pressure-receiving portions, while receiving the apply pressure of the C3 clutch hydraulic servo 86 at the other differential-diameter pressure-receiving portion. However, the first C1 cut-off valve 77 is not switched due to the pressure-receiving area with respect to that of the feedback pressure applied at the spool end of the first C1 cut-off valve 77. Thus, the solenoid valve (SLC1), although it receives the hydraulic pressure, does not output the hydraulic pressure in response to the signal-ON of the valve, whereby the apply pressure is not supplied to the C1 clutch hydraulic servo 84. Thus, the fifth speed is achieved by the simultaneous engagement of the C2 and C3 clutches.

The sixth speed is attained by the signal-OFF of the solenoid valve (SLC2), the signal-OFF of the solenoid valve (SLC3) and the signal-ON of the solenoid valve (SL1). In this state, the hydraulic pressure output from the solenoid valve (SL1) acts similarly to the case of the above-described fourth and fifth speeds. In this case, the apply pressure output from the solenoid valve (SLC3) in response to the signal-OFF of the valve (SLC3) is applied to the spring-loaded end of the B1-C3 release valve 79, whereby the B1-C3 release valve 79 is switched to the right half in FIG. 11. However, the apply pressure of the C2 clutch hydraulic servo 85 is applied to the pressure-receiving portion at the spool end of the B1-C3 relay valve 80, whereby the B1-C3 relay valve 80 is switched to the left half in FIG. 11. Thus, the C3 clutch hydraulic servo 86 is drained through the B1-C3 relay valve 80 and the B1-C3 release valve 79, and the hydraulic pressure output from the solenoid valve (SLC3) is instead supplied as an apply pressure to the B1 brake hydraulic servo 87 through the B1-C3 relay valve 80. On the other hand, the second C1 cut-off valve 78 connected to the D-range oil path L3 receives both apply pressures of the C2 clutch hydraulic servo 85 and the B1 brake hydraulic servo 87 at the differential-diameter pressure-receiving portions, respectively. However, the second C1 cut-off valve 78 is not switched due to the pressure-receiving area with respect to that of the feedback pressure applied to its spool end. The operation of the first C1 cut-off valve 77 is the same as that at the fifth speed, except that the hydraulic pressure of the C3 clutch hydraulic servo 86 is not applied. Thus, the sixth speed is attained by the engagement of the C2 clutch and the reaction support of the B1 brake.

The reverse is attained by the signal-OFF of the solenoid valve (SLC3). In this case, the D-range oil path L3 is drained. However, the hydraulic pressure of the R-range oil path L4 is supplied to the solenoid valves (SLC3, SLB1) through the shuttle valve 74. Therefore, the apply pressure output from the solenoid valve (SLC3) in response to the signal-OFF of the valve (SLC3) is supplied to the C3 clutch hydraulic servo 86 through the B1-C3 relay valve 80 that is positioned in the right half in the figure. On the other hand, the line pressure of the R-range oil path L4 is directly supplied to the B2 brake hydraulic servo 88 through the shuttle valve 75. Thus, the reverse is attained by the engagement of the C3 clutch and the reaction support of the B2 brake.

Hereinafter, operation of the above-described hydraulic control system in the case of failure will be described. In the event of the failure, each of the normally-open solenoid valves is caused to supply an apply pressure, regardless of the speed attained at that time. First, the failure at the first speed will be considered. At the first speed, due to the signal-OFF of the solenoid valve (SL1) and the connection of the C2 clutch hydraulic servo 85 to the drain oil path, the C2 supply relay valve 76 is positioned in the right half of FIG. 11 without receiving any signal pressure. Therefore, the input of the solenoid valve (SLC2) is connected to the drain oil path through the C2 supply relay valve 76. As a result, the solenoid valve (SLC2) does not output a hydraulic pressure even after the signal-OFF of the valve (SLC2). The solenoid valve (SLB1), having a supply path connected to the D-range oil path L3 through the shuttle valve 74 which is common to the solenoid valve (SLC3), outputs a hydraulic pressure. However, the B1-C3 release valve 79 is positioned in the right half in FIG. 11 due to the hydraulic pressure output from the solenoid valve (SLC3). Therefore, the hydraulic pressure from the solenoid valve (SLC3) is blocked by the B1-C3 release valve 79, and does not reach the B1 brake hydraulic servo 87. Moreover, the states of the first and second C1 cut-off valves 77 and 78 are the same as those at the first speed in the normal operation. Accordingly, both cut-off valves 77 and 78 are not switched. Thus, in the case of the failure at the first speed, the C1 and C3 clutches are simultaneously engaged, thereby achieving the third speed. Moreover, the respective apply pressures of the C3 clutch hydraulic servo 86 and the B1 brake hydraulic servo 87 are applied to the pressure-receiving portions of the B2 cut-off valve 81. As a result, the B2 cut-off valve 81 is switched to the left side in FIG. 11, thereby blocking the supply of the hydraulic pressure to the B2 brake hydraulic valve 88. However, since the hydraulic pressure is not supplied from the C2 supply relay valve 76, such blocking is not actually conducted.

At the second speed, the input of the solenoid valve (SLC2) is connected to the drain oil path through the C2 supply relay valve 76 for the same reason as described above in the failure at the first speed. Therefore, the solenoid valve (SLC2) does not output a hydraulic pressure even after the signal-OFF of the valve (SLC2). Moreover, the supply of the hydraulic pressure to the B1 brake hydraulic servo 87 is intercepted by the B1-C3 release valve 79 due to the hydraulic pressure of the solenoid valve (SLC3), whereby the hydraulic pressure to the B1 brake hydraulic servo 87 is drained. Accordingly, in the case of the failure at the second speed as well, the C1 and C3 clutches are simultaneously engaged, thereby achieving the third speed.

At the third speed, the input of the solenoid valve (SLC2) is connected to the drain oil path through the C2 supply relay valve 76 for the same reason as described above in the failure at the first speed. Therefore, the solenoid valve (SLC2) does not output a hydraulic pressure even after the signal-OFF of the valve (SLC2). Moreover, the supply of the hydraulic pressure to the B1 brake hydraulic servo 87 is intercepted by the proper supply of the hydraulic pressure by the solenoid valve (SLC3), whereby the hydraulic pressure of the B1 brake hydraulic servo 87 is drained. Accordingly, in the case of the failure at the third speed, simultaneous engagement of the C1 and C3 is kept, whereby the third speed is maintained.

At the fourth speed, the hydraulic pressure is applied to the C1 clutch hydraulic servo 84 through the second and first cut-off valves 78 and 77, whereas the hydraulic pressure is applied to the C2 clutch hydraulic servo 85 through the C2 supply relay valve 76. In the event of the failure, the solenoid valves (SLC3, SLB1) simultaneously output the respective apply pressures due to the signal-OFF of the solenoid valves (SLC3, SLB1). However, the B1-C3 release valve 79 is switched in response to the reception of the hydraulic pressure from the solenoid valve (SLC3) at the spring-loaded pressure-receiving portion. Thus, the hydraulic pressure from the solenoid valve (SLB1) is blocked so as not to be supplied to the B1 brake hydraulic servo 87 through the B1-C3 relay valve 80. It should be noted that, due to the signal-OFF of the solenoid valve (SL1), the hydraulic pressure is not output from the solenoid valve (SL1). However, at the spool-end pressure-receiving portion facing the plunger, the C2 supply relay valve 76 receives the hydraulic pressure of the C2 clutch hydraulic servo 85. Therefore, the valve 76 is kept positioned in the left half of FIGS. 11 and 12. On the other hand, the hydraulic pressure of the solenoid valve (SLC3) is generated in addition to the apply pressure to the C2 clutch hydraulic servo 85 and the apply pressure to the C1 clutch hydraulic servo 84. Therefore, the apply pressure to the C1 clutch hydraulic servo 84 is drained through the second C1 cut-off valve 78, because the second C1 cut-off valve 78 is switched in response to the reception of the hydraulic pressure through the B1-C3 relay valve 80 (as an apply pressure to the B1 brake hydraulic servo 87) at the differential-diameter pressure receiving portion. At this time, the hydraulic pressure is supplied to the input port of the B2 cut-off valve 81 through the C2 supply relay valve 76. At the fourth speed, however, the B2 cut-off valve 81 has been switched to the left side in response to the reception of the apply pressure to the C2 clutch hydraulic servo 85. Therefore, the hydraulic pressure is not supplied to the B2 brake hydraulic servo 88. Thus, in the case of the failure at the fourth speed, the C2 clutch and the B1 brake are engaged, thereby attaining the sixth speed.

At the fifth speed, the apply pressures are applied to the C2 clutch hydraulic servo 85 and the C3 clutch hydraulic servo 86, wherein the supply of the hydraulic pressure to the C3 clutch hydraulic servo 86 is conducted by the solenoid valve (SLB1). In the event of the failure, however, the B1-C3 release valve 79 is switched in response to the reception of the hydraulic pressure from the solenoid valve (SLC3). Therefore, the C3 clutch hydraulic servo 86 is drained through the B1-C3 relay valve 80 which has been switched in response to the reception of the apply pressure to the C2 clutch hydraulic servo 85. Instead, the apply pressure is supplied to the B1 brake hydraulic valve 87. Thus, in the case of the failure at the fifth speed as well, the C2 clutch and the B1 brake are engaged, thereby attaining the sixth speed.

At the sixth speed, the apply pressures are supplied to the C2 clutch hydraulic servo 85 and the B1 brake hydraulic servo 87. Because of the respective switching of the B1-C3 release valve 79 and the B1-C3 relay valve 80, simultaneous supply to the B1 brake hydraulic servo 87 and the C3 clutch hydraulic servo 86 does not occur. Therefore, such supply of the apply pressures to the C2 clutch hydraulic servo 85 and the B1 brake hydraulic servo 87 is maintained. Thus, in the case of the failure at the sixth speed, engagement of the C2 clutch and the B1 brake is maintained, thereby attaining the sixth speed.

It should be noted that, during the reverse, the supply of the line pressure from the manual valve 73 to the D-range oil path L3 is eliminated. Accordingly, the reverse is always attained regardless of the failure of the solenoid valves.

In this circuit structure as well, the hydraulic pressure of the D-range oil path L3 may be drained as a result of pressure reduction caused by switching of the manual valve 73 or by the stop of the oil pump 71 due to the engine OFF. Once the hydraulic pressure has been drained, the apply pressure is again output from each solenoid valve when the manual valve 73 is switched back to the position "D". In this case, oil-path connection, which is similar to that in the case of the failure at the first speed, is obtained. As a result, the solenoid valve (SLC2) does not output a hydraulic pressure. The solenoid valve (SLB1) outputs a hydraulic pressure, which, however, is not supplied to the B1 brake hydraulic servo 87. Accordingly, in this case as well, the C1 and C3 clutches are simultaneously engaged, attaining the third speed. Thus, starting and running at that speed can be realized.

FIG. 13 is a table showing the functions of the first C1 cut-off valve 77, the second C1 cut-off valve 78, the B2 cut-off valve 81, and the B1-C3 release valve 79. In the figure, the mark O indicates that the apply pressure output from the solenoid valve is supplied to the hydraulic servo of the clutch or brake; the mark ● indicates that such apply pressure is drained without being supplied to the hydraulic servo of the clutch or brake; and the mark ● indicates that the apply pressure is drained whether the apply pressure is supplied or not. For example, the first C1 cut-off valve 77 shown in the top row of the table drains the apply pressure supplied to the C1 clutch hydraulic servo 84 when the apply pressures are supplied to the C2 and C3 clutch hydraulic servos 85 and 86. The first C1 cut-off valve 77 also allows the apply pressures to be simultaneously supplied to the C1 and C2 clutch hydraulic servos 84 and 85. The first C1 cut-off valve 77 also allows the apply pressures to be simultaneously supplied to the C1 and C3 clutch hydraulic servos 84 and 86. Thus, according to this circuit operation, stoppage of the two or more brakes is always prevented in the event of the failure at each speed. Moreover, engagement of the two engaging elements including any one of the clutches is assured, whereby the gear train is not interlocked. Thus, the state in which the vehicle is able to run can be obtained.

Although the invention has been described in detail with respect to two embodiments, the idea of the invention is not limited to the illustrated hydraulic circuit, but is generally applicable to a wide variety of hydraulic control circuits.

What is claimed is:

1. A hydraulic control system of an automatic transmission including a plurality of engaging elements, a plurality of hydraulic servos each receiving a hydraulic pressure so as to control the respective engaging elements, and a plurality of shifting means for outputting the hydraulic pressure supplied to the respective hydraulic servo to achieve a plurality of forward speeds by engaging and disengaging the corresponding engaging elements, said hydraulic control system comprising:

a first hydraulic servo, included in the plurality of hydraulic servos, for an engaging element engaged upon attaining at least one high speed and disengaged upon attaining at least one low speed; and a supply switching means for switching a supply and discharge of the hydraulic pressure to the first hydraulic servo corresponding to a supplying state of a hydraulic pressure supplied to the first hydraulic servo, when all of the shifting means is in the event of a failure.

2. The hydraulic control system of the automatic transmission according to claim 1, wherein the plurality of hydraulic servos include a hydraulic servo of a first clutch engaged upon attaining forward first to fourth speeds, a hydraulic servo of a second clutch engaged upon attaining the fourth to sixth speeds, a hydraulic servo of a third clutch engaged upon attaining the third and fifth speeds, a hydraulic servo of a first brake engaged upon attaining the second and sixth speeds, a hydraulic servo of a second brake engaged upon attaining the first speed and the first hydraulic servo is the hydraulic servo of a second clutch.

3. The hydraulic control system of the automatic transmission according to claim 2, wherein when all of the shifting means is in the event of the failure, the switching means comprising:

first and second switching valves each cutting off supply of hydraulic pressure to the hydraulic servo of the first clutch from the corresponding shifting means by hydraulic pressure supplied to the hydraulic servo of the second clutch, a third switching valve selectively communicating the shifting means of the hydraulic servo of the third clutch and the shifting means of the hydraulic servo of the first brake with the hydraulic servo of the third clutch; and a fourth switching valve for cutting off supply of the hydraulic pressure to the hydraulic servo of the second brake by the hydraulic pressure which is selectively supplied to the respective hydraulic servos of the third clutch and the first brake.

4. The hydraulic control system of the automatic transmission according to claim 1, wherein a plurality of hydraulic servos include a hydraulic servo of a first clutch engaged upon attaining forward first to third speeds, a hydraulic servo of a second clutch engaged upon attaining the third and fourth speeds, a hydraulic servo of a first brake engaged upon attaining the second and fourth speeds, a hydraulic servo of a second brake engaged upon attaining the first speed and the first hydraulic servo is the hydraulic servo of a second clutch.

5. The hydraulic control system of the automatic transmission according to claim 1, wherein when all of the shifting means is in the event of the failure, the switching means comprising;

a first switching valve that cuts off supply of hydraulic pressure to the hydraulic servo of the second brake by the hydraulic pressure supplied to the hydraulic servo of the first brake when the hydraulic servo of the second brake is in a state where the hydraulic pressure can be supplied, and further cuts off supply of the hydraulic pressure to the hydraulic servo of the second brake by the hydraulic pressure when the hydraulic servo of the second clutch is in the state where the hydraulic pressure can be supplied; and a second switching valve that cuts off supply of the hydraulic pressure to the first clutch by supplying the hydraulic pressure to the hydraulic servo of the first brake.

6. The hydraulic control system of the automatic transmission according to claim 1, wherein the shifting means include electrically controlled solenoid valves and the failure is the electrical failure or sticking of the valves.

7. A hydraulic control system of an automatic transmission including a plurality of engaging elements, a plurality of hydraulic servos each receiving a hydraulic pressure so as to control the respective engaging elements, and a plurality of shifting means for outputting the hydraulic pressure supplied to the respective hydraulic servo to achieve a plurality of forward speeds by engaging and disengaging the corresponding engaging elements, said hydraulic control system comprising:

switching means for switching to a predetermined state where a specific speed among said plural forward speeds is achieved by cutting off a hydraulic pressure supply path to a specific hydraulic servo of a group of hydraulic servos which is disengaged when the specific speed is achieved, upon receipt of the output hydraulic pressure from at least one of said shifting means ready for outputting hydraulic pressure when all of the shifting means is in the event of a failure, wherein the switching means is switched by a hydraulic pressure outputted by the shifting means; and supply switching means, disposed in a hydraulic pressure supply path to a first hydraulic servo that is not included in said specific hydraulic servo, for switching between supply and cut-off states of the hydraulic pressure to the first hydraulic servo.

8. The hydraulic control system of the automatic transmission according to claim 7, wherein the switching means receives as a signal voltage at least the hydraulic pressure supplied to the first hydraulic servo and switched to the predetermined state only when the signal voltage is applied so as to achieve the specific speed by cutting off the supply of the hydraulic pressure to the specific hydraulic servo, and when the signal voltage is not applied so as to achieve another speed by continuing supply of the hydraulic pressure to a second hydraulic servo included in the specific hydraulic servo and the supply switching means allows the signal voltage to be supplied in a supply state and does not allow the signal to be supplied in the cut-off state.

9. The hydraulic control system of the automatic transmission according to claim 7, further comprising:

a solenoid valve that applies a signal voltage for switching the supply switching means, the solenoid valve switching the supply switching means to a supply side by applying the signal voltage to the supply switching means when achieving a speed with which the first hydraulic servo is engaged.

10. The hydraulic control system of the automatic transmission according to claim 8, further comprising:

a solenoid valve that applies a signal voltage for switching the supply switching means, the solenoid valve switching the supply switching means to a supply side by applying the signal voltage to the supply switching means when achieving a speed with which the first hydraulic servo is engaged.

11. The hydraulic control system of the automatic transmission according to claim 10, wherein the solenoid valve applies the signal voltage to the supply switching means so as to be brought into a cut-off state when in a de-energized state and the supply switching means receiving hydraulic pressure of the first hydraulic servo and being kept at the supply side by the hydraulic pressure supplied to the first hydraulic servo.

12. The hydraulic control system of the automatic transmission according to claim 9, wherein the solenoid valve applies the signal voltage to the supply switching means so as to be brought into a cut-off state when in a de-energized state and the supply switching means receiving hydraulic pressure of the first hydraulic servo and being kept at the supply side by the hydraulic pressure supplied to the first hydraulic servo.

13. The hydraulic control system of the automatic transmission according to claim 8, wherein the specific hydraulic servo includes a third hydraulic servo, a hydraulic servo which is not included in the specific hydraulic servo includes a fourth hydraulic servo and shifting means for supplying the respective hydraulic pressures to the third and fourth hydraulic servos is located downstream of the switching means, and a shifting valve for selectively shifting between the third and fourth hydraulic servos is disposed.

14. The hydraulic control system of the automatic transmission according to claim 13, wherein the shifting valve receives the hydraulic pressure of the first hydraulic servo and is switched in accordance with a state of the hydraulic-pressure supplied to the first hydraulic servo.

15. The hydraulic control system of the automatic transmission according to claim 8, wherein a plurality of hydraulic servos include a hydraulic servo of a first clutch engaged upon attaining forward first to third speeds, a hydraulic servo of a second clutch engaged upon attaining the third and fourth speeds, a hydraulic servo of a first brake engaged upon attaining the second and fourth speeds and a hydraulic servo of a second brake engaged upon attaining the first speed wherein when the hydraulic pressure is output from at least one of the shifting means ready for outputting hydraulic pressure, in case all of the shifting means is in the event of the failure, the switching means comprising:

a first switching valve that cuts off supply of hydraulic pressure to the hydraulic servo of the second brake by the hydraulic pressure supplied to the hydraulic servo of the first brake when the hydraulic servo of the second brake is in a state where the hydraulic pressure can be supplied, and further cuts off supply of the hydraulic pressure to the hydraulic servo of the second brake by the hydraulic pressure when the hydraulic servo of the second clutch is in the state where the hydraulic pressure can be supplied; and a second switching valve that cuts off supply of the hydraulic pressure to the first clutch by supplying the hydraulic pressure to the hydraulic servo of the first brake.

16. The hydraulic control system of the automatic transmission according to claim 8, wherein a plurality of hydraulic servos include a hydraulic servo of a first clutch engaged upon attaining forward first to fourth speeds, a hydraulic servo of a second clutch engaged upon attaining the fourth to sixth speeds, a hydraulic servo of a third clutch engaged upon attaining the third and fifth speeds, a hydraulic servo of a first brake engaged upon attaining the second and sixth speeds, and a hydraulic servo of a second brake engaged upon attaining the first speed wherein from at least one of the shifting means ready for outputting hydraulic pressure, in case all of the shifting means is in the event of the failure, the switching means comprising:

first and second switching valves each cutting off supply of hydraulic pressure to the hydraulic servo of the first clutch from the corresponding shifting means by hydraulic pressure supplied to the hydraulic servo of the second clutch;

a third switching valve selectively communicating the shifting means of the hydraulic servo of the third clutch and the shifting means of the hydraulic servo of the first brake with the hydraulic servo of the third clutch; and a fourth switching valve for cutting off supply of the hydraulic pressure to the hydraulic servo of the second brake by the hydraulic pressure which is selectively supplied to the respective hydraulic servos of the third clutch and the first brake.

* * * * *